United States Patent
Kumar et al.

(10) Patent No.: US 9,731,731 B2
(45) Date of Patent: *Aug. 15, 2017

(54) FUEL MANAGEMENT SYSTEM AND METHOD

(71) Applicant: General Electric Company, Schenectady, NY (US)

(72) Inventors: Ajith Kuttannair Kumar, Erie, PA (US); Adam E. Klingbeil, Erie, PA (US)

(73) Assignee: General Electric Company, Schenectady, NY (US)

(*) Notice: Subject to any disclaimer, the term of this patent is extended or adjusted under 35 U.S.C. 154(b) by 72 days.

This patent is subject to a terminal disclaimer.

(21) Appl. No.: 14/933,659

(22) Filed: Nov. 5, 2015

(65) Prior Publication Data
US 2016/0059872 A1 Mar. 3, 2016

Related U.S. Application Data

(63) Continuation of application No. 13/171,712, filed on Jun. 29, 2011, now Pat. No. 9,201,409, which is a
(Continued)

(51) Int. Cl.
*F02D 41/00* (2006.01)
*B61L 3/00* (2006.01)
*B61L 25/02* (2006.01)
*B61L 27/00* (2006.01)
*G05B 13/02* (2006.01)
(Continued)

(52) U.S. Cl.
CPC ............... *B61L 3/006* (2013.01); *B61C 5/00* (2013.01); *B61L 25/025* (2013.01); *B61L 25/026* (2013.01); *B61L 27/0027* (2013.01); *F02D 41/0025* (2013.01); *F02D 41/0027* (2013.01); *F02D 41/1406* (2013.01); *G05B 13/021* (2013.01); *B61L 2205/04* (2013.01); *F02D 41/26* (2013.01); *F02D 2200/501* (2013.01);
(Continued)

(58) Field of Classification Search
CPC .... B61L 3/006; B61L 25/026; B61L 27/0027; B61L 25/025; B61L 2205/04; F02D 41/0025; F02D 41/1406; F02D 41/0027; F02D 2200/501; F02D 2200/701; F02D 41/26; Y02T 10/36; Y02T 30/10; B61C 5/00; G05B 13/021
USPC ............................................................ 701/19
See application file for complete search history.

(56) References Cited

U.S. PATENT DOCUMENTS 6,947,830 B1 * 9/2005 Froloff .................. F02D 35/023
701/111
2001/0001131 A1 * 5/2001 Miller .................... B67D 7/744
700/239
(Continued)

*Primary Examiner* — Redhwan k Mawari
*Assistant Examiner* — Rodney P King
(74) *Attorney, Agent, or Firm* — Global Patent Operation; John A. Kramer

(57) ABSTRACT

A system includes an engine and a controller. The engine is capable of multiple operating modes, and each mode has a relatively different fuel ratio such that as the engine is changed from a first operating mode having a first ratio of a first fuel to a second fuel to a second operating mode having a second ratio of the first fuel to the second fuel. The controller is operable to change the engine from one operating mode to another operating mode.

20 Claims, 14 Drawing Sheets

Related U.S. Application Data continuation-in-part of application No. 11/385,354, filed on Mar. 20, 2006, and a continuation-in-part of application No. 11/671,533, filed on Feb. 6, 2007, now Pat. No. 7,974,774, and a continuation-in-part of application No. 11/385,354, filed on Mar. 20, 2006.

(60) Provisional application No. 60/870,562, filed on Dec. 18, 2006.

(51) Int. Cl.
*B61C 5/00* (2006.01)
*F02D 41/14* (2006.01)
*F02D 41/26* (2006.01)

(52) U.S. Cl.
CPC ......... *F02D 2200/701* (2013.01); *Y02T 10/36* (2013.01); *Y02T 30/10* (2013.01)

(56) References Cited

U.S. PATENT DOCUMENTS

| | | | |
|---|---|---|---|
| 2002/0104779 A1* | 8/2002 | Connor | C10L 1/026 208/15 |
| 2004/0133315 A1* | 7/2004 | Kumar | B61L 27/0027 700/302 |
| 2005/0229604 A1* | 10/2005 | Chen | F23R 3/54 60/776 |

* cited by examiner

FUEL MANAGEMENT SYSTEM AND METHOD

CROSS-REFERENCE TO RELATED APPLICATIONS

This application is a continuation of U.S. application Ser. No. 13/171,712, filed Jun. 29, 2011, which is a continuation-in-part of U.S. application Ser. No. 11/385,354 filed on Mar. 20, 2006 and a continuation-in-part of U.S. application Ser. No. 11/671,533 filed on Feb. 6, 2007. U.S. application Ser. No. 11/671,533 issued as U.S. Pat. No. 7,974,774 on Jul. 5, 2011. U.S. application Ser. No. 11/671,533 claims priority to U.S. Application No. 60/870,562 filed on Dec. 18, 2006, and is also a continuation-in-part of U.S. application Ser. No. 11/385,354 filed on Mar. 20, 2006.

TECHNICAL FIELD

Embodiments of this invention relate to fuel management operations, and a system for controlling a vehicle's operations.

DISCUSSION OF ART

Some vehicles may operate on two or more fuel types. The fuel types are provided to the engine for consumption in a static ratio. It may sometimes be desirable to have an engine that has operational modes that differ from the operation of currently available engines and associated systems.

BRIEF DESCRIPTION

An embodiment of the invention provides a system that includes an engine and a controller. The engine is capable of multiple operating modes, and each mode has a relatively different fuel ratio, and in a first operating mode the engine is configured to operate with a first ratio of a first fuel to a second fuel, and in a second operating mode the engine is configured to operate with a second ratio of the first fuel to the second fuel. The controller is operable to change the engine from one operating mode to another operating mode.

An embodiment of the invention provides a method for operating a vehicle including an engine operating on at least two types of fuel. The method includes implementing an engine operating mode based on characteristic information for each of the at least two types of fuel, and operational criteria of the vehicle.

An embodiment of the invention provides a method. The method includes controlling a fuel system to supply a first fuel at a first flow volume and a second fuel at a second flow volume to an engine to define an initial fuel ratio. The method further includes changing the first flow volume, the second flow volume, or both the first and second flow volumes to define a subsequent fuel ratio in response to a change in a power demand on the engine or in a speed of the engine.

An embodiment of the invention provides a method that includes controlling a fuel system to supply a first fuel at a first flow volume and a second fuel at a second flow volume to an engine to define an initial fuel ratio. The method further includes changing the first flow volume, the second flow volume, or both the first and second flow volumes to define a subsequent fuel ratio in response to a change in a location of the engine.

An embodiment of the invention provides a method that includes receiving a control input responsive to a trip plan for a vehicle from a user interface that is configured to display aspects of the trip plan to a user; and controlling a fuel system of the vehicle automatically based on the control input to supply a first fuel to an engine and to supply a different, second fuel to the engine. The engine can propel the vehicle using the first fuel and the second fuel. The control input is generated responsive to manipulation of the user interface. The control input includes at least one of a first signal or a second signal. The first signal indicates a user-selected throttle setting for the vehicle, and the fuel system is automatically controlled to supply the first fuel, the second fuel, or a combination of the first and second fuels to the engine based at least in part on the throttle setting. The second signal indicates a user-selected fuel ratio of the first fuel relative to the second fuel, and the fuel system is automatically controlled to supply the first fuel, the second fuel, or the combination of the first and second fuels to the engine based at least in part on the user-selected fuel ratio.

BRIEF DESCRIPTION OF THE DRAWINGS

Reference is made in detail to the embodiments consistent with the invention, examples of which are illustrated in the accompanying drawings. Wherever possible, the same reference numerals used throughout the drawings refer to the same or like parts. Understanding that these drawings depict embodiments of the invention and are not therefore to be considered to be limiting of its scope, the invention will be described and explained with additional specificity and detail through the use of the accompanying drawings in which.

DETAILED DESCRIPTION

Embodiments of this invention relate to fuel management operations, and a system for controlling a vehicle's operations. A system implements driving strategy of a vehicle controlling a train's operations to improve certain objective operating criteria parameter requirements while satisfying other constraints.

A vehicle consist may be described as having one or more propulsion systems connected together so as to provide motoring and/or braking capability. Each vehicle consist may have a first vehicle and one or more trail vehicle(s). A consist may be successive vehicles, and a consist group of propulsion systems also may be a consist when on distinct vehicles, such as when the consist is used in a distributed power operation. For distributed power, throttle and braking commands are relayed from a lead vehicle to a remote or trail vehicle by a radio link or physical cable.

Figure 1:
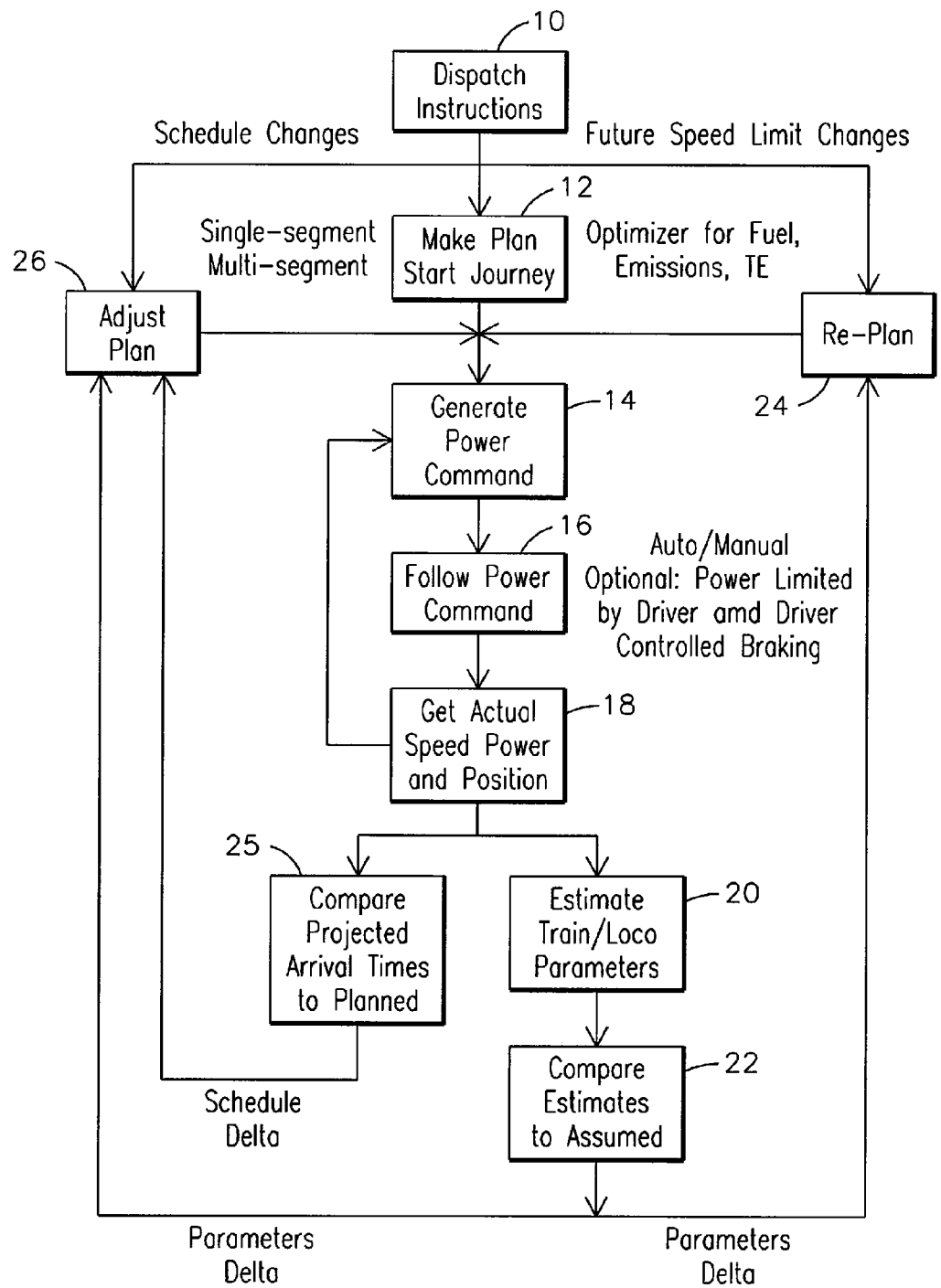
FIG. 1 depicts an exemplary illustration of a flow chart of one embodiment of the invention.

With reference to FIG. 1, instructions are input specific to planning a trip either on board or from a remote location, such as a dispatch center 10. Such input information includes, but is not limited to, vehicle position, consist description (such as vehicle models), vehicle power description, performance of vehicle traction transmission, consumption of engine fuel of two or more types as a function of output power, cooling characteristics, the intended trip route (effective track grade and curvature as function of milepost or an "effective grade" component to reflect curvature following standard railroad practices), the vehicle represented by car makeup and loading together with effective drag coefficients, trip desired parameters including start time and location, end location, desired travel time, crew (user and/or operator) identification, crew shift expiration time, and route.

This data may be provided to the vehicle 42 by an operator manually entering this data into the vehicle 42 via an onboard display, inserting a memory device such as a portable hard drive and/or USB drive containing the data into a receptacle aboard the vehicle, and transmitting the information via wireless communication from a central or wayside location 41, such as a track signaling device and/or a wayside device, to the vehicle 42. Vehicle 42 and vehicle 31 load characteristics (e.g., drag) may also change over the route (e.g., with altitude, ambient temperature and condition of the rails and rail-cars), and the plan may be updated to reflect such changes as needed by real-time autonomous collection of vehicle/train conditions. This includes for example, changes in vehicle or vehicle characteristics detected by monitoring equipment on or off board the vehicle(s) 42.

The track signal system determines the allowable speed of the train. There are many types of track signal systems and the operating rules associated with each of the signals. For example, some signals have a single light (on/off), some signals have a single lens with multiple colors, and some signals have multiple lights and colors. These signals can indicate the track is clear and the vehicle may proceed at max allowable speed. They can also indicate a reduced speed or stop is required. This reduced speed may need to be achieved immediately, or at a certain location (e.g., prior to the next signal or crossing).

The signal status is communicated to the vehicle and/or operator through various means. Some systems have circuits in the track and inductive pick-up coils on the vehicles. Other systems have wireless communications systems. Signal systems can also require the operator to visually inspect the signal and take the appropriate actions. The signaling system may interface with the on-board signal system and adjust the vehicle speed according to the inputs and the appropriate operating rules. For signal systems that require the operator to visually inspect the signal status, the operator screen will present the appropriate signal options for the operator to enter based on the train's location. The type of signal systems and operating rules, as a function of location, may be stored in an onboard database 63.

Based on the specification data input into an embodiment of the invention, an optimal plan which minimizes fuel use and/or emissions produced subject to speed limit constraints along the route with desired start and end times is computed to produce a trip profile 12. The profile contains the optimal speed and power (notch) settings the vehicle is to follow, expressed as a function of distance and/or time, and such vehicle operating limits including the maximum notch power and brake settings, and speed limits as a function of location, and the expected fuel usage (in the aggregate and individually as fuel types) and the resulting emissions generated. In one embodiment, the value for the notch setting is selected to obtain throttle change decisions about once every 10 to 30 seconds. The throttle change decisions may occur at a longer or shorter duration, if needed and/or desired to follow an optimal speed profile. The profiles provide power settings for the train, either at the vehicle level, consist level and/or individual vehicle level. Power comprises braking power, motoring power, and airbrake power.

The procedure used to compute the optimal profile can be any number of methods for computing a power sequence that drives the vehicle 31 to minimize fuel and/or emissions subject to vehicle operating and schedule constraints, as summarized below. In some cases the required optimal profile may be close enough to one previously determined, owing to the similarity of the vehicle configuration, route and environmental conditions. In these cases it may be sufficient to look up the driving trajectory within a database 63 and attempt to follow it. When no previously computed plan is suitable, methods to compute a new one include, but are not limited to, direct calculation of the optimal profile using differential equation models which approximate the vehicle physics of motion. The setup involves selection of a quantitative objective function, commonly a weighted sum (integral) of model variables that correspond to rate of fuel consumption and emissions generation plus a term to penalize excessive throttle variation.

An optimal control formulation is set up to minimize the quantitative objective function subject to constraints including but not limited to, speed limits and minimum and maximum power (throttle) settings. Depending on planning objectives at any time, the problem may be setup flexibly to minimize fuel subject to constraints on emissions and speed limits, or to minimize emissions, subject to constraints on fuel use and arrival time. It is also possible to setup, for example, a goal to minimize the total travel time without constraints on total emissions or fuel use where such relaxation of constraints would be permitted or required for the mission.

Throughout the document exemplary equations and objective functions are presented for minimizing vehicle fuel consumption. These equations and functions are for illustration only as other equations and objective functions can be employed to optimize fuel consumption or to optimize other vehicle/train operating parameters. Mathematically, the problem to be solved may be stated more precisely. The basic physics are expressed by:

$$\frac{dx}{dt} = v; x(0) = 0.0; x(T_f) = D$$

$$\frac{dv}{dt} = T_e(u, v) - G_a(x) - R(v); v(0) = 0.0; v(T_f) = 0.0$$

Where x is the position of the train, v its velocity and t is time (in miles, miles per hour and minutes or hours as appropriate) and u is the notch (throttle) command input. Further, D denotes the distance to be traveled, $T_f$ the desired arrival time at distance D along the track, $T_e$ is the tractive effort produced by the vehicle consist, $G_a$ is the gravitational drag which depends on the vehicle length, vehicle makeup and terrain on which the vehicle is located, R is the net speed dependent drag of the vehicle consist and vehicle combination. The initial and final speeds can also be specified, but without loss of generality are taken to be zero here (train stopped at beginning and end). Finally, the model is readily modified to include other important dynamics such the lag between a change in throttle, u, and the resulting tractive effort or braking. Using this model, an optimal control formulation is set up to minimize the quantitative objective function subject to constraints including but not limited to, speed limits and minimum and maximum power (throttle) settings. Depending on planning objectives at any time, the problem may be setup flexibly to minimize fuel subject to constraints on emissions and speed limits, or to minimize emissions, subject to constraints on fuel use and arrival time.

It is also possible to setup, for example, a goal to minimize the total travel time without constraints on total emissions or fuel use where such relaxation of constraints would be permitted or required for the mission. All these performance measures can be expressed as a linear combination of any of the following:

1. $\min_{u(t)} \int_0^{T_f} F(u(t))dt$ – Minimize total fuel consumption

2. $\min_{u(t)} T_f$ – Minimize Travel Time

3. $\min_{u_i} \sum_{i=2}^{n_d} (u_i - u_{i-1})^2$ – Minimize notch jockeying (piecewise constant input)

$\min_{u(t)} \int_0^{T_f} (du/dt)^2 dt$ – Minimize notch jockeying (continuous input)

Replace the fuel term F in (1) with a term corresponding to emissions production, For example, for emissions $\min_{u(t)} \int_0^{T_f} E(u(t))dt$ – Minimize total emissions In this equation E is the quantity of emissions in gm/hphr for each of the notches (or power settings). A minimization could be done based on a weighted total of fuel and emissions. A commonly used and representative objective function is thus:

$$\min_{u(t)} \alpha_1 \int_0^{T_f} F(u(t))dt + \alpha_3 T_f + \alpha_2 \int_0^{T_f} (du/dt)^2 dt \quad \text{(OP)}$$

The coefficients of the linear combination will depend on the importance (weight) given for each of the terms. When the vehicle operates on multiple fuel types, the fuel term F is a linear sum combination of the fuel efficiencies of each fuel type used by the vehicle, as discussed in further detail below. Note that in equation (OP), u(t) is the optimizing variable which is the continuous notch position. If discrete power levels are required, the solution to equation (OP) would be discretized, which may result in less fuel saving. Finding a minimum time solution ($\alpha_1$ and $\alpha_2$ set to zero) is used to find a lower bound on, the preferred embodiment is to solve the equation (OP) for various values of $T_f$ with $\alpha_3$ set to zero. For those familiar with solutions to such optimal problems, it may be necessary to adjoin constraints, e.g., the speed limits along the path:

$$0 \leq v \leq SL(x)$$

Or when using minimum time as the objective, that an end point constraint must hold, e.g. total fuel consumed must be less than what is in the tank, e,g., via:

$$0 < \int_0^{T_f} F(u(t))dt \leq W_F$$

Where $W_F$ is the fuel remaining in the tank at $T_f$. The equation (OP) can be in other forms as well and that what is presented above is an exemplary equation for use in the embodiment of the invention.

Reference to emissions is directed towards cumulative emissions produced in the form of oxides of nitrogen (NOx), carbon oxides (COx), unburned hydrocarbons (HC), oxides of sulfur (SOx), and particulate matter (PM), etc. However, other emissions may include a maximum value of electromagnetic emission, such as a limit on radio frequency (RF) power output, measured in watts, for respective frequencies emitted by the vehicle. Yet another form of emission is the noise produced by the vehicle, typically measured in decibels (dB). An emission requirement may be variable based on a time of day, a time of year, and/or atmospheric conditions such as weather or pollutant level in the atmosphere. Emission regulations may vary geographically across a railroad system. For example, an operating area such as a city or state may have specified emission objectives, and an adjacent area may have different emission objectives, for example a lower amount of allowed emissions or a higher fee charged for a given level of emissions.

Accordingly, an emission profile for a certain geographic area may be tailored to include maximum emission values for each of the regulated emissions including in the profile to meet a predetermined emission objective required for that area. For a vehicle, these emission parameters are determined by the power (Notch) setting, ambient conditions, engine control method, etc. By design, every vehicle must be compliant with EPA emission standards, and thus in an embodiment of the invention that optimizes emissions this may refer to mission-total emissions, for which there is no current EPA specification. Operation of the vehicle according to the optimized trip plan is at all times compliant with EPA emission standards. Because diesel engines are used in other applications, other regulations may also be applicable.

If an objective during a trip mission is to reduce emissions, the optimal control formulation, equation (OP), would be amended to consider this trip objective. Flexibility in the optimization setup allows trip objectives to vary by geographic region or mission. For example, for a high priority train, minimum time may be the only objective on one route because it is high priority traffic. In another example, emission output could vary from state to state along the planned vehicle route.

To solve the resulting optimization problem. In one embodiment the invention transcribes a dynamic optimal control problem in the time domain to an equivalent static mathematical programming problem with N decision variables, where the number 'N' depends on the frequency at which throttle and braking adjustments are made and the duration of the trip. For typical problems, this N can be in the thousands. For example, in one embodiment, suppose a vehicle is traveling a 172-mile stretch of track in the southwest United States. Utilizing one embodiment of the invention, an exemplary 7.6% saving in fuel used may be realized when comparing a trip determined and followed using one embodiment of the invention versus an actual driver throttle/speed history where the trip was determined by an operator. The improved savings is realized because the optimization realized by using the one embodiment of the invention produces a driving strategy with both less drag loss and little or no braking loss compared to the trip plan of the operator.

Figure 2:
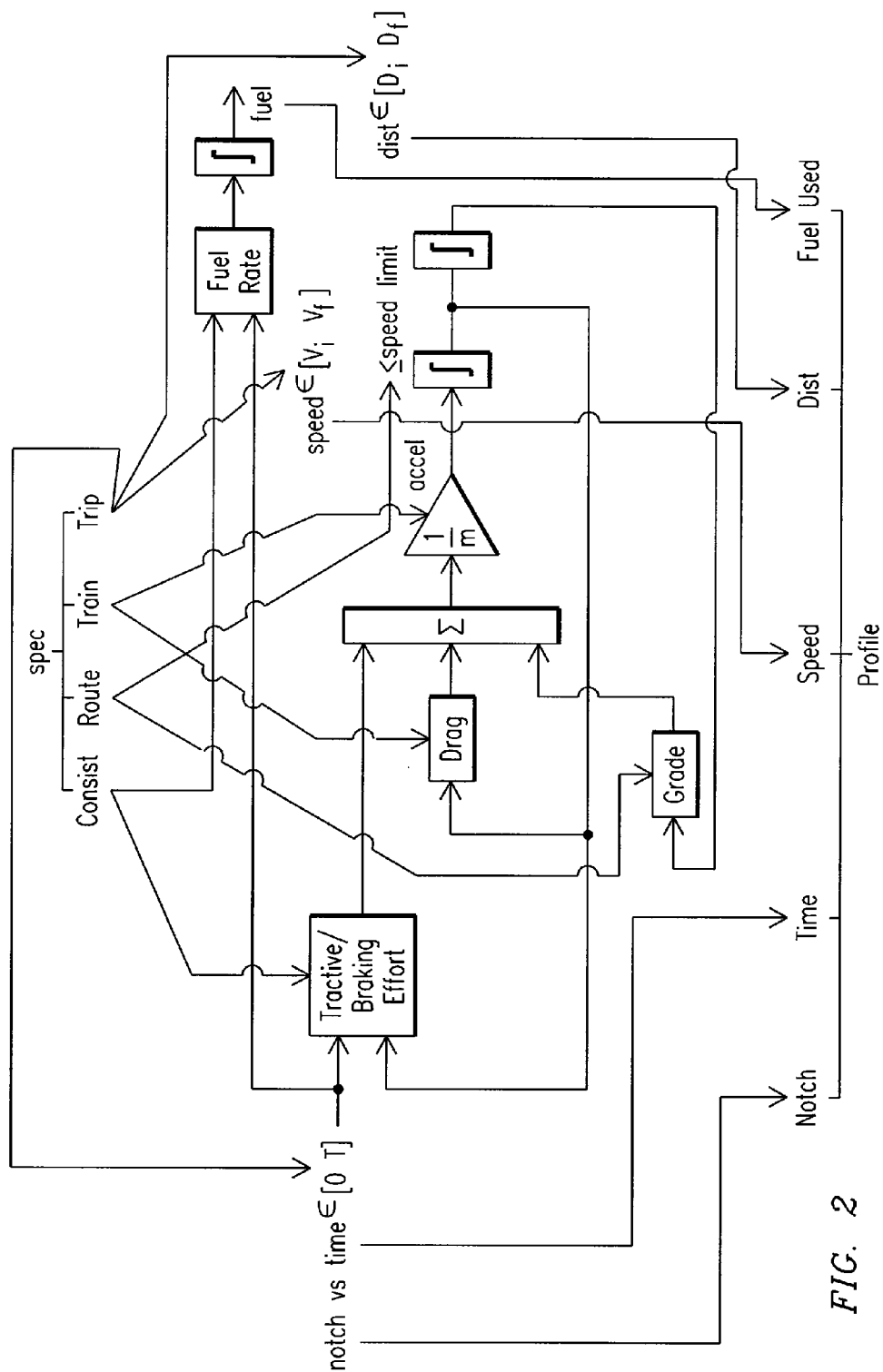
FIG. 2 depicts a simplified model of the vehicle that may be employed.

To make the optimization described above computationally tractable, a simplified model of the vehicle may be employed, such as illustrated in FIG. 2 and the equations discussed above. A refinement to the optimal profile is produced by driving a more detailed model with the optimal power sequence generated, to test if other thermal, electrical and mechanical constraints are violated, leading to a modified profile with speed versus distance that is closest to a run that can be achieved without harming vehicle or vehicle equipment, i.e. satisfying additional implied constraints such thermal and electrical limits on the vehicle and inter-car forces in the train.

Referring back to FIG. 1, once the trip is started 12, power commands are generated 14 to put the plan in motion. Depending on the operational set-up of one embodiment of the invention, one command is for the vehicle to follow the optimized power command 16 so as to achieve the optimal speed. One embodiment of the invention obtains actual speed and power information from the vehicle consist of the vehicle 18. Owing to the inevitable approximations in the models used for the optimization, a closed-loop calculation of corrections to optimized power is obtained to track the desired optimal speed. Such corrections of vehicle operating limits can be made automatically or by the operator, who always has ultimate control of the train.

In some cases, the model used in the optimization may differ significantly from the actual train. This can occur for many reasons, including but not limited to, extra cargo pickups or setouts, vehicles that fail in route, and errors in the initial database 63 or data entry by the operator. For these reasons a monitoring system is in place that uses real-time vehicle data to estimate vehicle and/or vehicle parameters in real time 20. The estimated parameters are then compared to the assumed parameters used when the trip was initially created 22. Based on any differences in the assumed and estimated values, the trip may be re-planned 24, should large enough savings accrue from a new plan.

Other reasons a trip may be re-planned include directives from a remote location, such as dispatch and/or the operator requesting a change in objectives to be consistent with more global movement planning objectives. More global movement planning objectives may include other vehicle schedules, allowing exhaust to dissipate from a tunnel, maintenance operations, etc. Another reason may be due to an onboard failure of a component. Strategies for re-planning may be grouped into incremental and major adjustments depending on the severity of the disruption, as discussed in more detail below. A "new" plan may be derived from a solution to the optimization problem equation (OP) described above, but faster approximate solutions can be found, as described herein.

Figure 4:
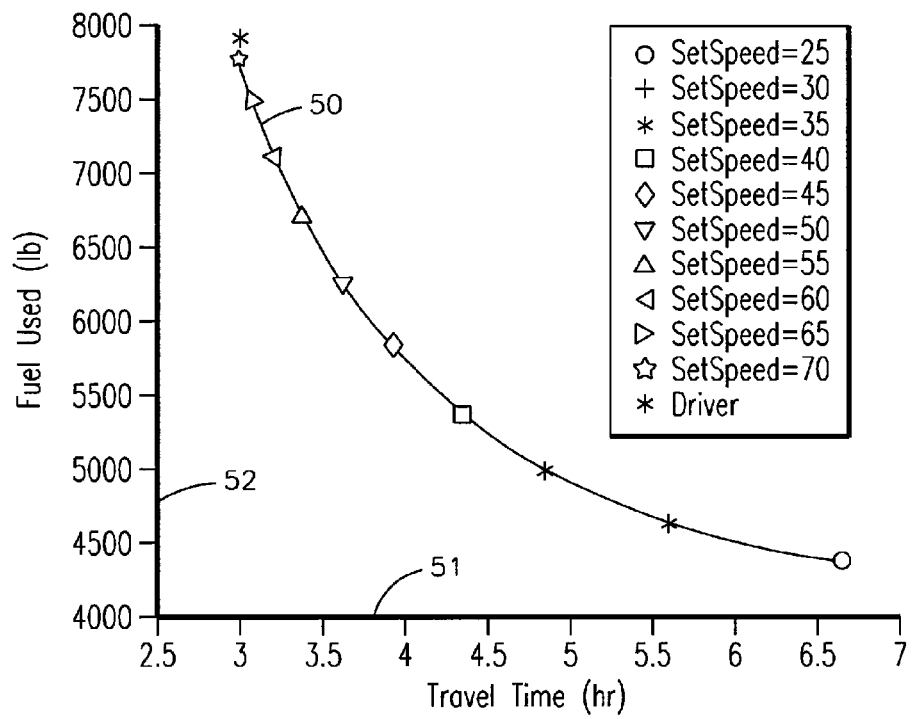
FIG. 4 depicts an exemplary embodiment of a fuel-use/travel time curve.

In operation, the vehicle 42 will continuously monitor system efficiency and continuously update the trip plan based on the actual efficiency measured, whenever such an update would improve trip performance. Re-planning computations may be carried out entirely within the vehicle(s) or fully or partially moved to a remote location, such as dispatch or wayside processing facilities where wireless technology is used to communicate the plans to the vehicle 42. One embodiment of the invention may also generate efficiency trends that can be used to develop vehicle fleet data regarding efficiency transfer functions. The fleet-wide data may be used when determining the initial trip plan, and may be used for network-wide optimization tradeoff when considering locations of a plurality of trains. For example, the travel-time fuel use tradeoff curve as illustrated in FIG. 4 reflects a capability of a vehicle on a particular route at a current time, updated from ensemble averages collected for many similar trains on the same route. Thus, a central dispatch facility collecting curves like FIG. 4 from many vehicles could use that information to better coordinate overall vehicle movements to achieve a system-wide advantage in fuel use or throughput.

Many events in daily operations can lead to a need to generate or modify a currently executing plan, where it desired to keep the same trip objectives, for when a vehicle is not on schedule for planned meet or pass with another vehicle and it needs to make up time. Using the actual speed, power and location of the vehicle, a comparison is made between a planned arrival time and the currently estimated (predicted) arrival time 25. Based on a difference in the times, as well as the difference in parameters (detected or changed by dispatch or the operator), the plan is adjusted 26. This adjustment may be made automatically following a railroad company's desire for how such departures from plan should be handled or manually propose alternatives for the on-board operator and dispatcher to jointly decide the best way to get back on plan. Whenever a plan is updated but where the original objectives, such as but not limited to arrival time remain the same, additional changes may be factored in concurrently, e.g. new future speed limit changes, which could affect the feasibility of ever recovering the original plan. In such instances if the original trip plan cannot be maintained, or in other words the vehicle is unable to meet the original trip plan objectives, as discussed herein other trip plan(s) may be presented to the operator and/or remote facility, or dispatch.

A re-plan may also be made when it is desired to change the original objectives. Such re-planning can be done at either fixed preplanned times, manually at the discretion of the operator or dispatcher, or autonomously when predefined limits, such a vehicle operating limits, are exceeded. For example, if the current plan execution is running late by more than a specified threshold, such as thirty minutes, one embodiment of the invention can re-plan the trip to accommodate the delay at expense of increased fuel as described above or to alert the operator and dispatcher how much of the time can be made up at all (i.e. what minimum time to go or the maximum fuel that can be saved within a time constraint). Other triggers for re-plan can also be envisioned based on fuel consumed or the health of the power consist, including but not limited time of arrival, loss of horsepower due to equipment failure and/or equipment temporary malfunction (such as operating too hot or too cold), and/or detection of gross setup errors, such in the assumed vehicle load. That is, if the change reflects impairment in the vehicle performance for the current trip, these may be factored into the models and/or equations used in the optimization.

Changes in plan objectives can also arise from a need to coordinate events where the plan for one vehicle compromises the ability of another vehicle to meet objectives and arbitration at a different level, e.g. the dispatch office is required. For example, the coordination of meets and passes may be further optimized through train-to-train communications. Thus, as an example, if a vehicle knows that it is behind in reaching a location for a meet and/or pass, communications from the other vehicle can notify the late vehicle (and/or dispatch). The operator can then enter information pertaining to being late into one embodiment of the invention which will recalculate the train's trip plan. The embodiment of the invention can also be used at a high level, or network-level, to allow a dispatch to determine which vehicle should slow down or speed up should a scheduled meet and/or pass time constraint may not be met. As discussed herein, this is accomplished by trains transmitting data to the dispatch to prioritize how each vehicle should change its planning objective. A choice could depend either from schedule or fuel saving benefits, depending on the situation.

For any of the manually or automatically initiated re-plans, the exemplary embodiment of the invention may present more than one trip plan to the operator. In one embodiment the invention will present different profiles to the operator, allowing the operator to select the arrival time and understand the corresponding fuel and/or emission impact. Such information can also be provided to the dispatch for similar consideration, either as a simple list of alternatives or as a plurality of tradeoff curves such as illustrated in FIG. 4.

The exemplary embodiment of the invention has the ability of learning and adapting to key changes in the vehicle and power consist which can be incorporated either in the current plan and/or for future plans. For example, one of the triggers discussed above is loss of horsepower. When building up horsepower over time, either after a loss of horsepower or when beginning a trip, transition logic is utilized to determine when desired horsepower is achieved. This information can be saved in the vehicle database 61 for use in optimizing either future trips or the current trip should loss of horsepower occur again.

Figure 3:
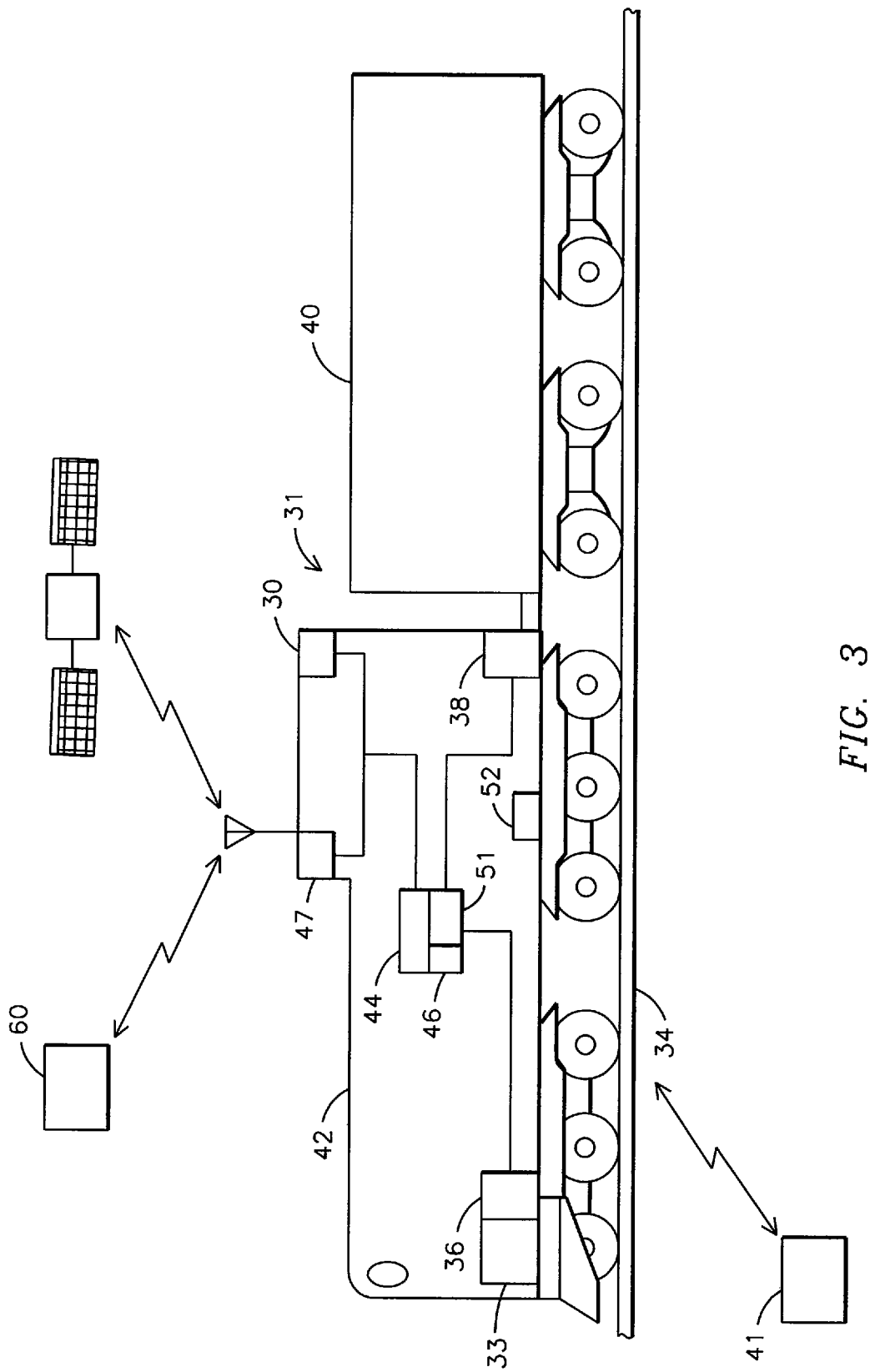
FIG. 3 depicts an exemplary embodiment of elements of the invention.

FIG. 3 depicts an exemplary embodiment of elements of the invention. A locator device 30 to determine a location of the vehicle 31 is provided. The locator device 30 can be a GPS sensor, or a system of sensors, that determine a location of the vehicle 31. Examples of such other systems may include, but are not limited to, wayside devices, such as radio frequency automatic equipment identification (RF AEI) Tags, dispatch, and/or video determination. Another system may include the tachometer(s) aboard a vehicle and distance calculations from a reference point. As discussed previously, a wireless communication system 47 may also be provided to allow for communications between trains and/or with a remote location, such as dispatch. Information about travel locations may also be transferred from other trains.

A track characterization element 33 to provide information about a track is also provided. Suitable characterization elements may include grade, elevation slow warnings, environmental conditions (e.g., rain and snow), and curvature information. The track characterization element 33 may include an on-board track integrity database 36. Sensors 38 are used to measure a tractive effort 40 being hauled by the vehicle consist 42, throttle setting of the vehicle consist 42, vehicle consist 42 configuration information, speed of the vehicle consist 42, individual vehicle configuration, individual vehicle capability, etc. In one embodiment the vehicle consist 42 configuration information may be loaded without the use of a sensor 38, but is input by other approaches. Furthermore, the availability of fuel or the ability to use a particular one of the fuel types from one or more fuel car tenders may also be considered. For example, if one vehicle in consist is unable to use a fuel ratio that is relatively higher (>90%) natural gas compared to diesel, this information is used when optimizing the trip plan.

Information from the locator device may also be used to determine an appropriate arrival time of the vehicle 31. For example, if there is a vehicle 31 moving along a track 34 towards a destination and no vehicle is following behind it, and the vehicle has no fixed arrival deadline to adhere to, the locator device, including but not limited to radio frequency automatic equipment identification (RF AEI) tags, dispatch, and/or video determination, may be used to gage the exact location of the vehicle 31. Furthermore, inputs from these signaling systems may be used to adjust the vehicle speed. Using the on-board track database, discussed below, and the locator device, such as GPS, the embodiment of the invention can adjust the operator interface to reflect the signaling system state at the given vehicle location. In a situation where signal states would indicate restrictive speeds ahead, the planner may elect to slow the vehicle to conserve fuel consumption.

Information from the locator device may also be used to change planning objectives as a function of distance to destination. For example, owing to uncertainties about availability of one fuel type along the route, reliance on another fuel type in the early part of a route may be employed as hedge against delays that statistically occur later. If it happens on a particular trip that there is no issue with fuel type availability, the objectives on a latter part of the journey can be modified to exploit the built-in fuel reserve that was banked earlier, and thereby recover some fuel flexibility.

FIG. 3 further discloses other elements that may be part of the embodiment of the invention. A processor 44 (e.g., processing system) is provided that is operable to receive information from the locator device 30, track characterizing element 33, and sensors 38. A controller operates within the processor 44. The controller is used to compute an optimized trip plan based on parameters involving the vehicle 42, vehicle 31, track 34, and objectives of the mission as described above. In one embodiment, the trip plan is established based on models for vehicle behavior as the vehicle 31 moves along the track 34 as a solution of non-linear differential equations derived from physics with simplifying assumptions that are provided in the algorithm. The controller has access to the information from the locator device 30, track characterizing element 33 and/or sensors 38 to create a trip plan minimizing fuel consumption of a vehicle consist 42, minimizing emissions of a vehicle consist 42, establishing a desired trip time, and/or ensuring proper crew operating time aboard the vehicle consist 42. In one embodiment, a controller 51 is also provided for controlling the vehicle as it follows the trip plan. In one embodiment, the controller makes vehicle operating decisions autonomously and/or automatically. Particularly, the controller acts as a close loop feedback mechanism without intervention by a person. Alternatively, an operator may be advised by the controller to manually direct the vehicle to follow the trip plan.

The inventive system may create an initial plan when a long distance is involved. When a total length of a trip profile exceeds a given distance, a controller 46 may be used to segment the mission wherein the mission may be divided by waypoints. The waypoint may include natural locations where the vehicle 31 stops, such as sidings where a meet with opposing traffic, or pass with a vehicle behind the current vehicle, is scheduled to occur on single-track rail, or at yard sidings or industry where cars are to be picked up and set out, and locations of planned work. At such waypoints, the vehicle may be required to be at the location at a scheduled time and be stopped or moving with speed in a specified range. Dwell time is the time duration from arrival to departure at waypoints.

The controller may break down a longer trip into smaller segments in a systematic way. Each segment can be somewhat arbitrary in length, but may be picked at a natural location such as a stop or significant speed restriction or at mileposts that define junctions with other routes. Given a partition, or segment, selected in this way, a driving profile is created for each segment of track as a function of travel time taken as an independent variable, such as shown in FIG. 4. The fuel used/travel-time tradeoff associated with each segment can be computed prior to the vehicle 31 reaching that segment of track. A total trip plan can be created from the driving profiles created for each segment. The example of the invention distributes travel time amongst all the segments of the trip in an optimal way so that the total trip time required is satisfied and total fuel consumed over all the segments is as small as possible. An exemplary trip segment is disclosed in FIG. 6 and discussed below. Through segments are discussed, the trip plan may comprise a single segment representing the complete trip.

FIG. 4 depicts an exemplary embodiment of a fuel-use/travel time curve. As mentioned previously, such a curve 50 is created when calculating an optimal trip profile for various travel times for each segment. That is, for a given travel time 51, fuel used 52 is the result of a detailed driving profile computed as described above. Once travel times for each segment are allocated, a power/speed plan is determined for each segment from the previously computed solutions. If there are any waypoint constraints on speed between the segments, such as a change in a speed limit, they are matched up during creation of the optimal trip profile. If speed restrictions change in only a single segment, the fuel use/travel-time curve 50 has to be re-computed for only the segment changed. This reduces time for having to re-calculate more parts, or segments, of the trip. If the vehicle consist or vehicle changes significantly along the route, e.g., from loss of a vehicle or pickup or set-out of cars, then driving profiles for all subsequent segments must be recomputed creating new instances of the curve 50. These new curves 50 would then be used along with new schedule objectives to plan the remaining trip.

Once a trip plan is created, a trajectory of speed and power versus distance is used to reach a destination with minimum fuel and/or emissions at the required trip time. There are several ways in which to execute the trip plan. In one embodiment, an open loop coaching mode displays information to the operator for the operator to follow to achieve the required power and speed determined according to the optimal trip plan. In the coaching mode, the operating information is suggested operating conditions that the operator should use.

In another embodiment, an open/closed loop operating mode handles acceleration and maintains a constant speed until the vehicle 31 must be slowed. Then, the operator is responsible for applying a braking system 52. In another exemplary embodiment, the controller commands power and braking as required to follow the desired speed-distance path.

Feedback control strategies provide corrections to the power control sequence in the profile to correct for such events as vehicle load variations caused by fluctuating head winds and/or tail winds. Another such error may be caused by an error in vehicle parameters, such as vehicle mass and/or drag, when compared to assumptions in the optimized trip plan. Another type of error may occur with information contained in the track database 36, or may involve un-modeled performance differences due to the vehicle engine, traction motor thermal deration and/or other factors. Feedback control strategies compare the actual speed as a function of position to the speed in the desired optimal profile. Based on this difference, a correction to the optimal power profile is added to drive the actual velocity toward the optimal profile. To assure stable regulation, a compensation algorithm may be provided which filters the feedback speeds into power corrections to obtain closed-performance stability. Compensation may include dynamic compensation to meet performance objectives.

A sub-optimal decomposition method may find an optimal trip profile to determine the fuel-optimal trip from point A to point B where there are stops along the way, and for updating the trip for the remainder of the trip once the trip has begun. Using modeling, a trip plan can be determined with specified travel time and initial and final speeds, so as to satisfy all the speed limits and vehicle capability constraints when there are stops. The inventive system may be useful for controlling one or more of fuel usage, emissions, schedule, crew comfort, and load impact. If the maximum time an engine may operate is limited by the amount and types of fuel on board, then the trip plan may include a refueling point. The method may be used at the outset in developing a trip plan, and to adapting to changes in objectives after initiating a trip.

Figure 5:
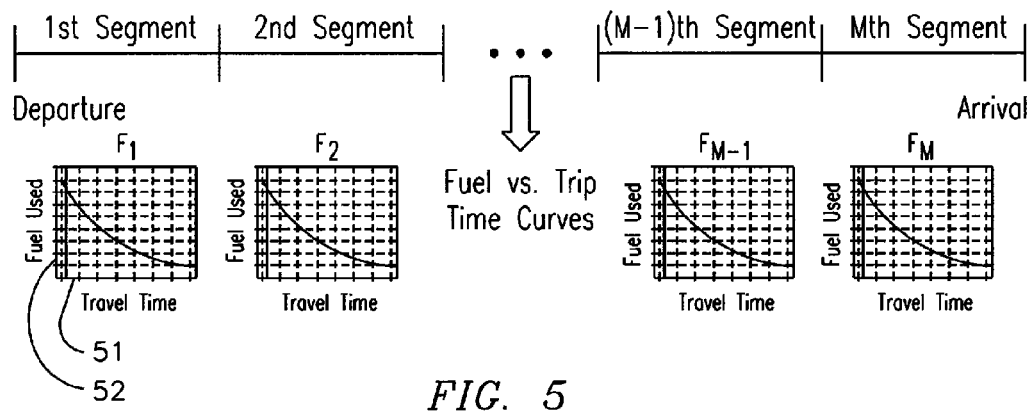
FIG. 5 depicts an exemplary embodiment of segmentation decomposition for trip planning.
Figure 6:
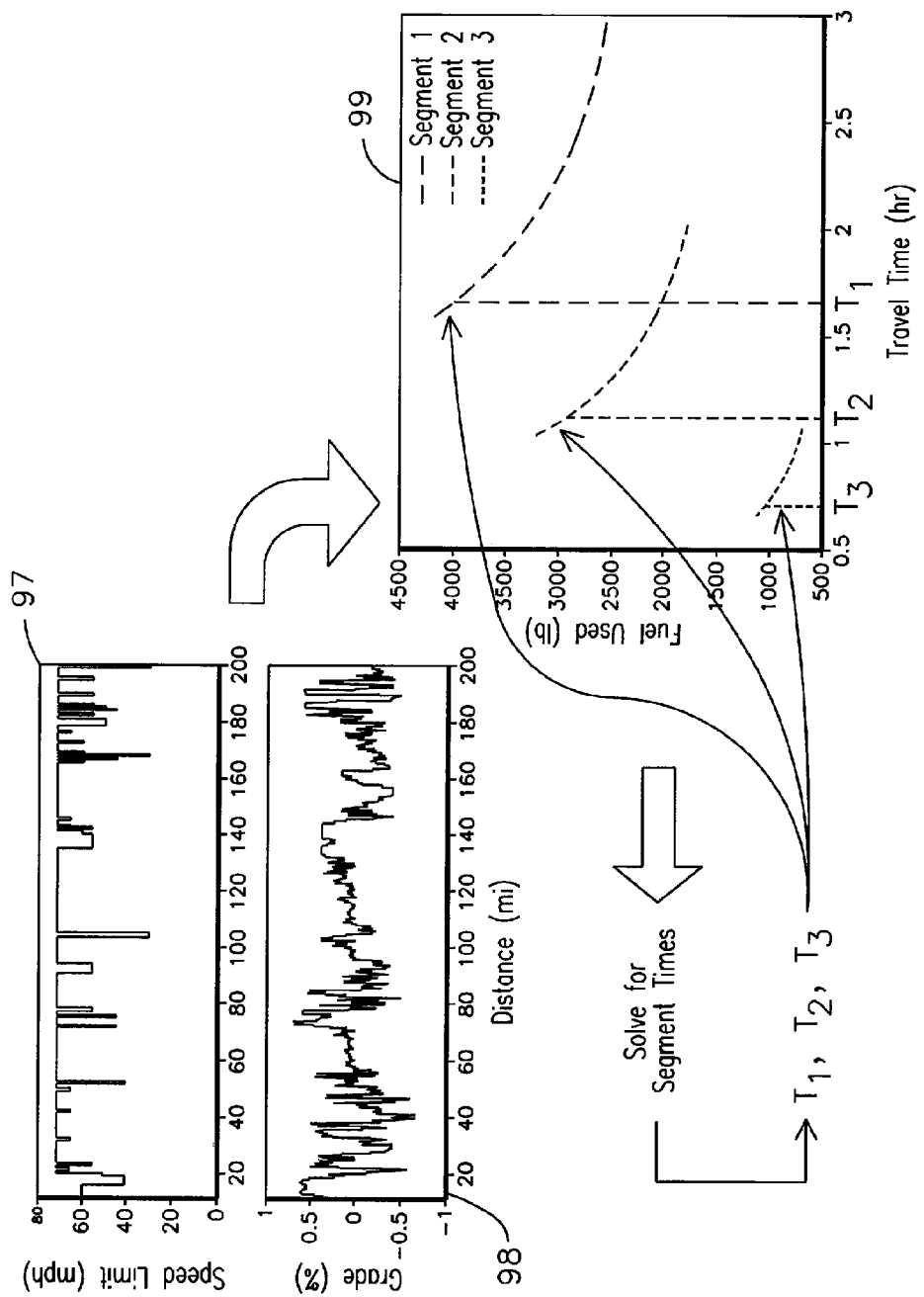
FIG. 6 depicts an exemplary embodiment of a segmentation example.

As discussed herein, the controller may employ a setup as illustrated in the exemplary flow chart depicted in FIG. 5, and as an exemplary segment 3 depicted in detail in FIG. 6. As illustrated, the trip may be broken into two or more segments, T1, T2, and T3. The segment boundaries may not result in equal segments. Instead, the segments may use natural or mission specific boundaries. Optimal trip plans are pre-computed for each segment. If fuel use or fuel type use is compared versus trip time, these curves are built for each segment. As discussed herein, the curves may take into account other factors, too. When trip time is the parameter being determined, trip time for each segment is computed while satisfying the overall trip time constraints. FIG. 6 illustrates speed limits for an exemplary segment 3 for a 200 mile trip 97. Further illustrated are grade changes over the 200 mile trip 98. A combined chart 99 illustrating curves for each segment of the trip of fuel used over the travel time is also shown.

Using the optimal control setup described previously, a trip plan is found with specified travel time and initial and final speeds, so as to satisfy the speed limits and vehicle capability constraints when there are stops. Though the following detailed discussion is directed towards optimizing fuel ratio and fuel use, it can also be applied to optimize other factors as discussed herein. Flexible modality may accommodate desired dwell time at stops and to consider constraints on earliest arrival and departure at a location as may be required, for example, in single-track operations where the time to be in or get by a siding is critical.

The embodiment of the invention finds a fuel-optimal trip from distance $D_0$ to $D_M$, traveled in time T, with M−1 intermediate stops at $D_1, \ldots, D_{M-1}$, and with the arrival and departure times at these stops constrained by $$t_{min}(i) \le t_{arr}(D_i) \le t_{max}(i) - \Delta t_i$$

$$t_{arr}(D_i) + \Delta t_i \le t_{dep}(D_i) \le t_{max}(i) \quad i=1, \ldots, M-1$$

where $t_{arr}(D_i)$, $t_{dep}(D_i)$, and $\Delta t_i$ are the arrival, departure, and minimum stop time at the $i^{th}$ stop, respectively. Assuming that fuel-optimality implies minimizing stop time, therefore $t_{dep}(D_i) = t_{arr}(D_i) + \Delta t_i$ which eliminates the second inequality above. Suppose for each $i=1, \ldots, M$, the fuel-optimal trip from $D_{i-1}$ to $D_i$ for travel time t, $T_{min}(i) \le t \le T_{max}(i)$, is known. Let $F_i(t)$ be the fuel-use corresponding to this trip. If the travel time from $D_{j-1}$ to $D_j$ is denoted $T_j$, then the arrival time at $D_i$ is given by:

$$t_{arr}(D_i) = \sum_{j=1}^{i} (T_j + \Delta t_{j-1})$$

where $\Delta t_0$ is defined to be zero. The fuel-optimal trip from $D_0$ to $D_M$ for travel time T is then obtained by finding $T_i$, $i=1, \ldots, M$, which minimize $$\sum_{i=1}^{M} F_i(T_i) T_{min}(i) \le T_i \le T_{max}(i)$$

subject to $$t_{min}(i) \le \sum_{j=1}^{i} (T_j + \Delta t_{j-1}) \le t_{max}(i) - \Delta t_i \quad i=1, \ldots, M-1$$

$$\sum_{j=1}^{M} (T_j + \Delta t_{j-1}) = T$$

Once a trip is underway, the issue is re-determining the fuel-optimal solution for the remainder of a trip (originally from $D_0$ to $D_M$ in time T) as the trip is traveled, but where disturbances preclude following the fuel-optimal solution. Let the current distance and speed be x and v, respectively, where $D_{i-1} < x \le D_i$. Also, let the current time since the beginning of the trip be $t_{act}$. Then the fuel-optimal solution for the remainder of the trip from x to $D_M$, which retains the original arrival time at $D_M$, is obtained by finding $\tilde{T}_i, T_j, j=i+1, \ldots M$, which minimize $$\tilde{F}_i(\tilde{T}_i, x, v) + \sum_{j=i+1}^{M} F_j(T_j)$$

subject to $$t_{min}(i) \le t_{act} + \tilde{T}_i \le t_{max}(i) - \Delta t_i$$

$$t_{min}(k) \le t_{act} + \tilde{T}_i + \sum_{j=i+1}^{k} (T_j + \Delta t_{j-1}) \le t_{max}(k) - \Delta t_k$$

$$k = i+1, \ldots, M-1$$

$$t_{act} + \tilde{T}_i + \sum_{j=i+1}^{M} (T_j + \Delta t_{j-1}) = T$$

Here, $\tilde{F}_i(t,x,v)$ is the fuel-used of the optimal trip from x to $D_i$, traveled in time t, with initial speed at x of v.

As discussed above, an exemplary way to enable more efficient re-planning is to construct the optimal solution for a stop-to-stop trip from partitioned segments. For the trip from $D_{i-1}$ to $D_i$, with travel time choose a set of intermediate points $D_{ij}$, $j=1, \ldots, N_i-1$. Let $D_{i0}=D_{i-1}$ and $D_{iN_i}=D_i$. Then express the fuel-use for the optimal trip from $D_{i-1}$ to $D_i$ as $$F_i(t) = \sum_{j=1}^{N_i} f_{ij}(t_{ij} - t_{i,j-1}, v_{i,j-1}, v_{ij})$$

where $f_{ij}(t, v_{i,j-1}, v_{ij})$ is the fuel-use for the optimal trip from $D_{i,j-1}$ to $D_{ij}$, traveled in time t, with initial and final speeds of $v_{i,j-1}$ and $v_{ij}$. Furthermore, $t_{ij}$ is the time in the optimal trip corresponding to distance $D_{ij}$. By definition, $t_{iN_i} - t_{i0} = T_i$. Since the vehicle is stopped at $D_{i0}$ and $D_{iN_i}$, $v_{i0} = v_{iN_i} = 0$.

The above expression enables the function $F_i(t)$ to be alternatively determined by first determining the functions $f_{ij}(\bullet)$, $1 \le j \le N_i$, then finding $\tau_{ij}$, $1 \le j \le N_i$ and $v_{ij}$, $1 \le j < N_i$, which minimize $$F_i(t) = \sum_{j=1}^{N_i} f_{ij}(\tau_{ij}, v_{i,j-1}, v_{ij})$$

subject to $$\sum_{j=1}^{N_i} \tau_{ij} = T_i$$

$$v_{min}(i, j) \le v_{ij} \le v_{max}(i, j) \quad j = 1, \ldots, N_i - 1$$

$$v_{i0} = v_{iN_i} = 0$$

By choosing $D_{ij}$ (e.g., at speed restrictions or meeting points), $v_{max}(i,j) - v_{min}(i,j)$ can be minimized, thus minimizing the domain over which $f_{ij}(\ )$ needs to be known.

Based on the partitioning above, a simpler suboptimal re-planning approach than that described above is to restrict re-planning to times when the vehicle is at distance points $D_{ij}$, $1 \le i \le M$, $1 \le j \le N_i$. At point $D_{ij}$, the new optimal trip from $D_{ij}$ to $D_M$ can be determined by finding $\tau_{ik}$, $j < k \le N_i$, $v_{ik}$, $j < k < N_i$, and $\tau_{mn}$, $i < m \le M$, $1 \le n \le N_m$, $v_{mn}$, $i < m \le M$, $1 \le n < N_m$, which minimize $$\sum_{k=j+1}^{N_i} f_{ik}(\tau_{ik}, v_{i,k-1}, v_{ik}) + \sum_{m=i+1}^{M} \sum_{n=1}^{N_m} f_{mn}(\tau_{mn}, v_{m,n-1}, v_{mn})$$

subject to $$t_{min}(i) \le t_{act} + \sum_{k=j+1}^{N_i} \tau_{ik} \le t_{max}(i) - \Delta t_i$$

$$t_{min}(n) \le t_{act} + \sum_{k=j+1}^{N_i} \tau_{ik} + \sum_{m=i+1}^{n} (T_m + \Delta t_{m-1}) \le t_{max}(n) - \Delta t_n$$

-continued $$n = i+1, \ldots, M-1$$

$$I_{act} + \sum_{k=j+1}^{N_i} \tau_{ik} + \sum_{m=i+1}^{M} (T_m + \Delta t_{m-1}) = T$$

where $$T_m = \sum_{n=1}^{N_m} \tau_{mn}$$

A further simplification is obtained by waiting on the re-computation of $T_m$, i<m≤M, until distance point $D_i$ is reached. In this way, at points $D_{ij}$ between $D_{i-1}$ and $D_i$, the minimization above needs only be performed over $\tau_{ik}$, j<k≤$N_i$, $v_{ik}$, j<k<$N_i$·$T_i$ is increased as needed to accommodate any longer actual travel time from $D_{i-1}$ to $D_{ij}$ than planned. This increase is later compensated, if possible, by the re-computation of $T_m$, i<m≤M, at distance point $D_i$.

With respect to closed-loop configurations, the total input energy required to move a vehicle 31 from point A to point B includes the sum of four components, specifically difference in kinetic energy between points A and B; difference in potential energy between points A and B; energy loss due to friction and other drag losses; and energy dissipated by the application of brakes. Assuming the start and end speeds to be equal (e.g., stationary), the first component is zero. Furthermore, the second component may be independent of driving strategy. It suffices to minimize the sum of the last two components.

Following a constant speed profile minimizes drag loss. Following a constant speed profile minimizes total energy input when braking is not needed to maintain constant speed. However, if braking is required to maintain constant speed, applying braking just to maintain constant speed will most likely increase total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, the new optimal notch/speed plan can be followed using the closed loop control described herein. However, in some situations there may not be enough time to carry out the segment decomposed planning described above, and particularly when there are critical speed restrictions that must be respected, an alternative is needed. A smart cruise control algorithm is an efficient way to generate, on the fly, an energy-efficient (hence fuel-efficient) sub-optimal prescription for driving the vehicle 31 over a known terrain. The controller knows the vehicle 31 position along the track 34, as well as knowledge of the grade and curvature of the track versus position. The method relies on a point-mass model for the motion of the vehicle 31, whose parameters may be adaptively estimated from online measurements of vehicle motion.

The smart cruise control algorithm has three principal components, specifically a modified speed limit profile that serves as an energy-efficient guide around speed limit reductions; an ideal throttle or dynamic brake setting profile that attempts to balance between minimizing speed variation and braking; and a mechanism for combining the latter two components to produce a notch command, employing a speed feedback loop to compensate for mismatches of modeled parameters when compared to reality parameters.

Smart cruise control can accommodate strategies in the embodiment of the invention that do no active braking (i.e., the driver is signaled and assumed to provide the requisite braking) or a variant that does active braking.

With respect to the cruise control algorithm that does not control dynamic braking, the three exemplary components are a modified speed limit profile that serves as an energy-efficient guide around speed limit reductions, a notification signal directed to notify the operator when braking should be applied, an ideal throttle profile that attempts to balance between minimizing speed variations and notifying the operator to apply braking, a mechanism employing a feedback loop to compensate for mismatches of model parameters to reality parameters.

Also included in the embodiment of the invention is an approach to identify parameter values of the vehicle 31. For example, with respect to estimating vehicle mass, a Kalman filter and a recursive least-squares approach may be utilized to detect errors that may develop over time.

Figure 7:
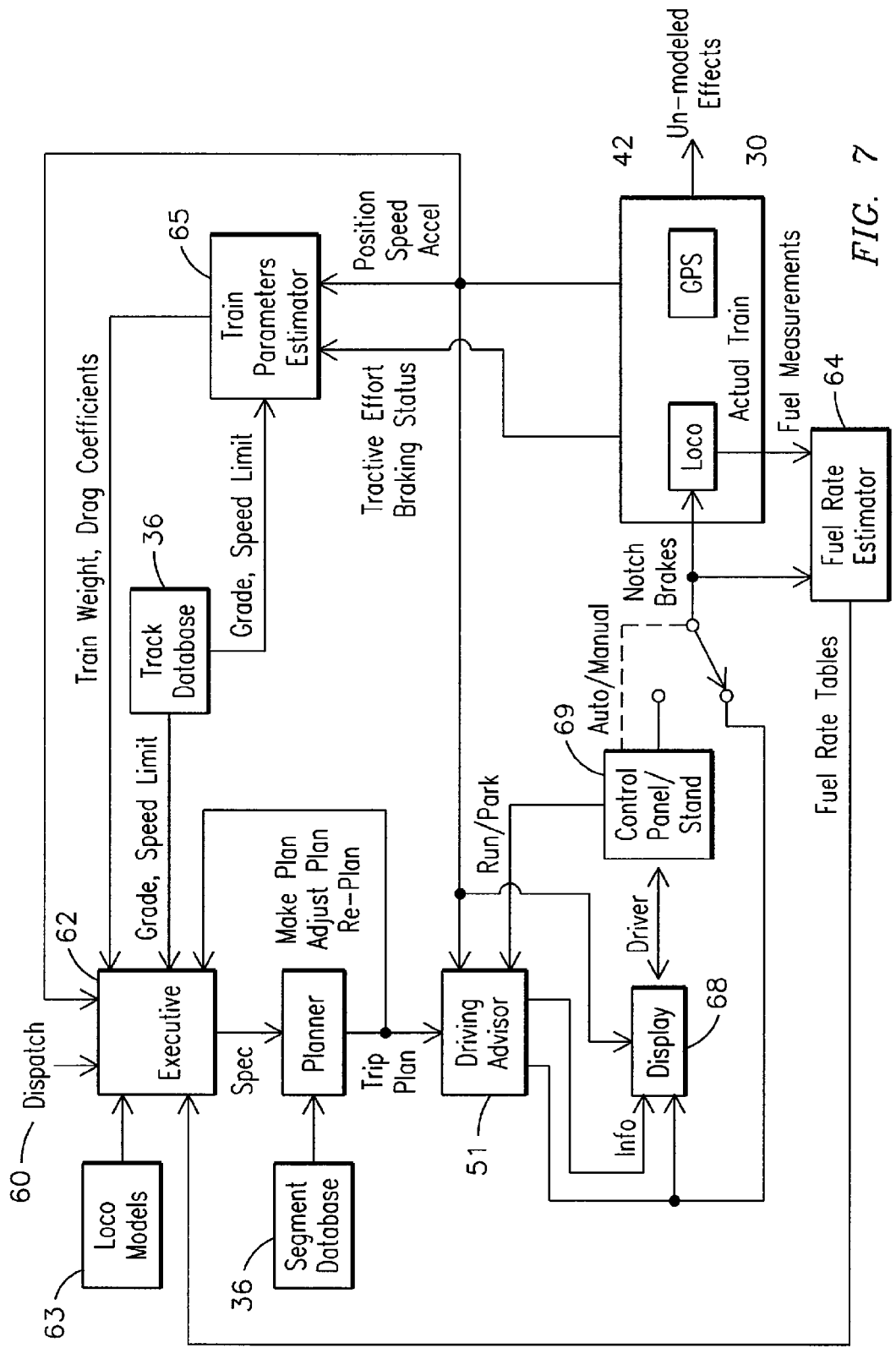
FIG. 7 depicts an exemplary flow chart of one embodiment of the invention.

FIG. 7 depicts an exemplary flow chart of a system including an embodiment of the invention. As discussed previously, a remote facility, such as a dispatch 60 can provide information to the controller. As illustrated, such information is provided to an executive control element 62. Also supplied to the executive control element 62 is vehicle modeling information database 63, information from a track database 36 such as track grade information and speed limit information, estimated vehicle parameters such as vehicle weight and drag coefficients, and fuel rate tables from a fuel rate estimator 64. The executive control element 62 supplies information to the planner 12 (see FIG. 1). Once a trip plan has been calculated, the plan is supplied to one or more of the driving advisor, the driver, or the controller. The trip plan is also supplied to the executive control element 62 so that it can compare the trip when other new data is provided.

As discussed above, the driving advisor 51 can automatically set a notch power, either a pre-established notch setting or an optimum continuous notch power. In addition to supplying a speed command to the vehicle 31, a display 68 is provided so that the operator can view what the planner has recommended. The operator also has access to a control panel 69. Through the control panel 69 the operator can decide whether to apply the notch power recommended. Towards this end, the operator may limit a targeted or recommended power. That is, at any time the operator may have final authority over what is the power setting at which the vehicle consist will operate. This includes deciding whether to apply braking if the trip plan recommends slowing the vehicle 31. Based on how the vehicle 31 is functioning, information regarding fuel measurements of each fuel type is supplied to the fuel rate estimator 64. Since direct measurement of fuel flows may not be readily available, all information on fuel consumed so far within a trip and projections into the future following optimal plans may be carried out using calibrated physics models such as those used in developing the optimal plans. For example, such predictions may include but are not limited to, the use of measured gross horse-power and known fuel characteristics of each of the multiple fuel types used on board to derive the cumulative fuel used of each fuel type individually, and of the total fuel used collectively.

The vehicle 31 may have a locator device 30 such as a GPS sensor. Information is supplied to the vehicle parameters estimator 65. Such information may include, but is not limited to, GPS sensor data, tractive/braking effort data, braking status data, speed and any changes in speed data. With information regarding grade and speed limit information, vehicle weight and drag coefficients information is supplied to the executive control element 62.

The system may use continuously variable power throughout the optimization planning and closed loop control implementation. In a conventional vehicle, power may be quantized to eight discrete levels. With continuous power, the vehicle can optimize operating conditions, e.g., by minimizing auxiliary loads and power transmission losses, and fine tuning engine performance based on fuel characteristics. Further, the vehicle 42 may use the on-board track database 36 and the forecasted performance requirements to dynamically select a ratio of a first fuel type relative to a second fuel type, and to commit fuel for use. For example, if one fuel type is stored as a liquid but is used as a gas, then the committal of transformation of the liquid to gas may be made passed on the forecasted performance. Because re-liquefaction would be undesirable in some instances, it would be prudent to have only the needed amount of fuel converted. On the other hand, if there is a lag in the conversion process a delay in providing the gaseous form may be also undesirable.

The controller may use the on-board track database 36 and the forecasted performance to adjust the vehicle performance, such as to insure that the vehicle has sufficient fuel reserves (e.g., committed gaseous fuel) as the vehicle approaches a hill and/or tunnel. This could be expressed as a constraint at a particular location that becomes part of the optimal plan generation created solving the equation (OP). Additionally, the controller may incorporate train-handling rules, such as tractive effort ramp rates and maximum braking effort ramp rates. These may be incorporated directly into the formulation for optimum trip profile or alternatively incorporated into the closed loop regulator.

When operating in distributed power mode, the operator in a lead vehicle can control operating functions of remote vehicles in the remote consists via a control system, such as a distributed power control element. When operating in distributed power, the operator can command each vehicle consist to operate at a different notch power level (or one consist could be in motoring and other could be in braking) wherein each individual vehicle in the vehicle consist operates at the same notch power. In one embodiment, a notch power level for a remote vehicle consist is desired as recommended by the optimized trip plan so that the controller communicate this power setting to the remote vehicle consists for implementation.

The controller may be used with consists in which the vehicles are not contiguous, e.g., with one or more vehicles in front, others in the middle and at the rear for train. The standard connection between the vehicles is replaced by radio link or auxiliary cable to link the vehicles externally. When operating in distributed power, the operator in a lead vehicle can control operating functions of remote vehicles in consist via a control system, such as controller and a distributed power control element. When operating in distributed power, each vehicle can to operate at a different notch power level (or one vehicle could be in motoring and other could be in braking) wherein each individual in the vehicle consist operates at the same notch power.

When consist optimizer is used with a vehicle consist, the controller may determine engine settings (including fuel ratios) and notch power for each vehicle in the vehicle consist. The controller may make continuous corrections and re-planning with respect to when the vehicle consist uses braking based on upcoming items of interest, such as railroad crossings, grade changes, approaching sidings, approaching depot yards, and approaching fuel stations where one or more types of fuels may be available.

Figure 8:
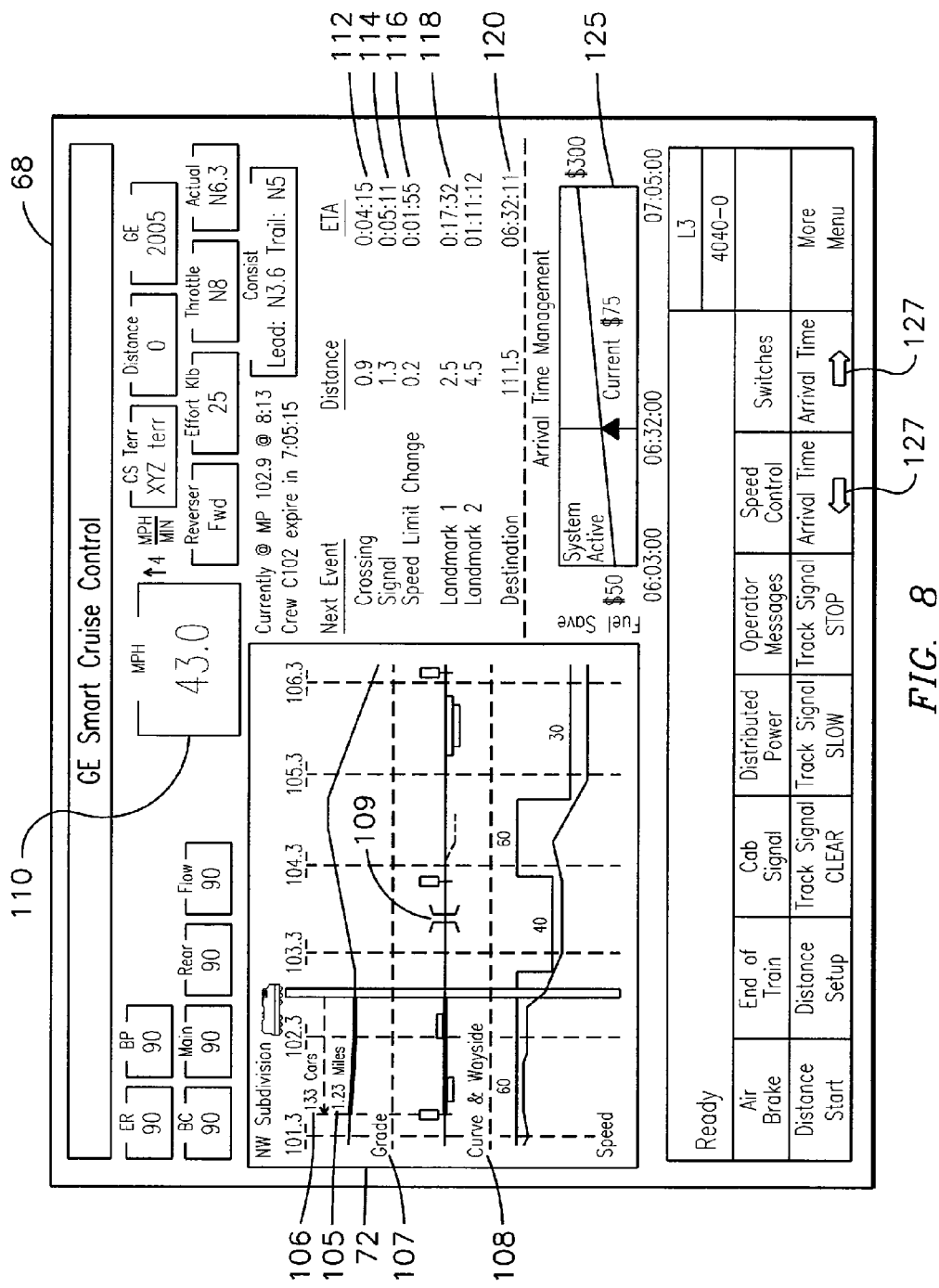
FIG. 8 depicts an exemplary illustration of a dynamic display for use by the operator.
Figure 9:
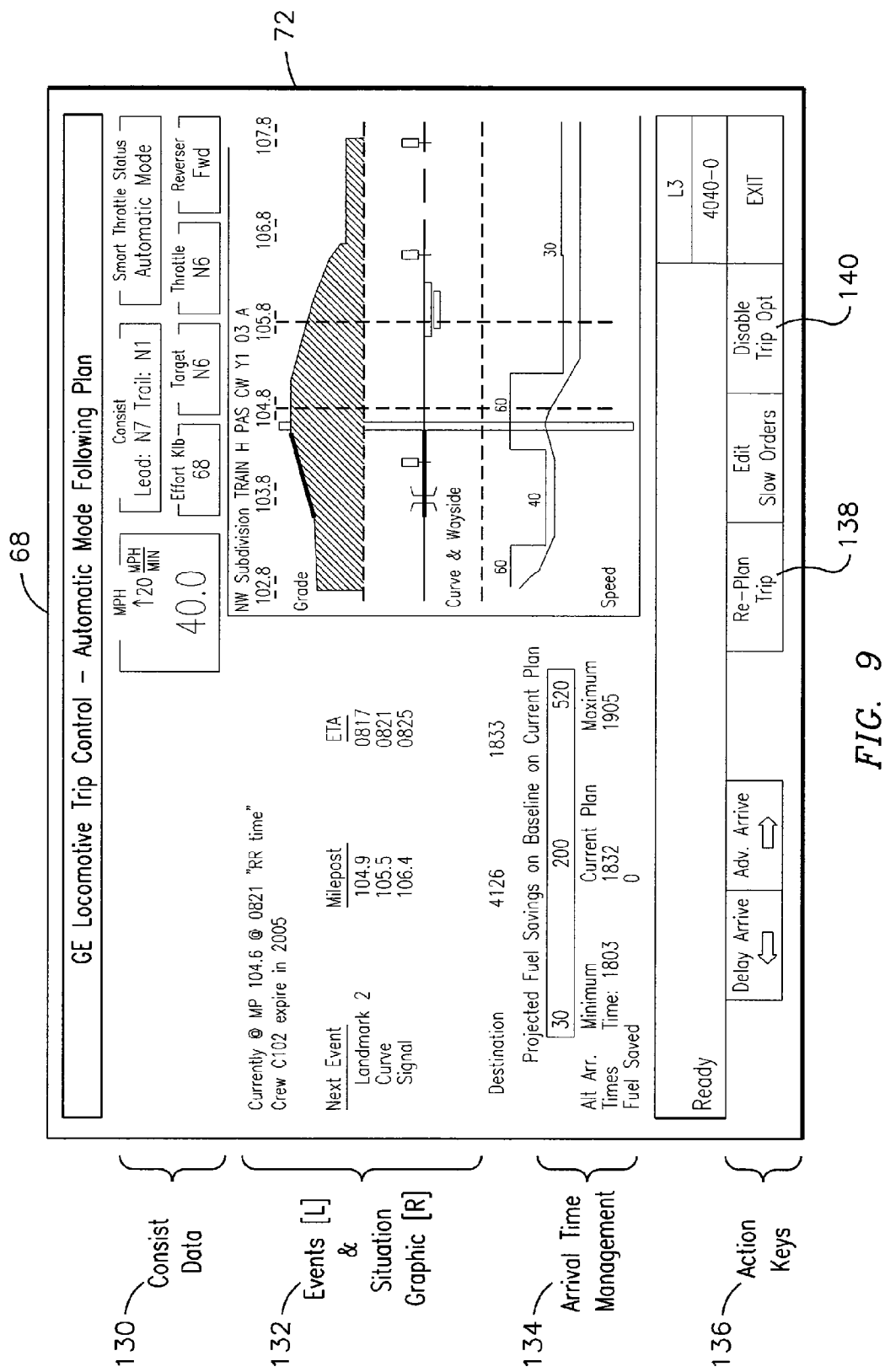
FIG. 9 depicts another exemplary illustration of a dynamic display for use by the operator.
Figure 10:
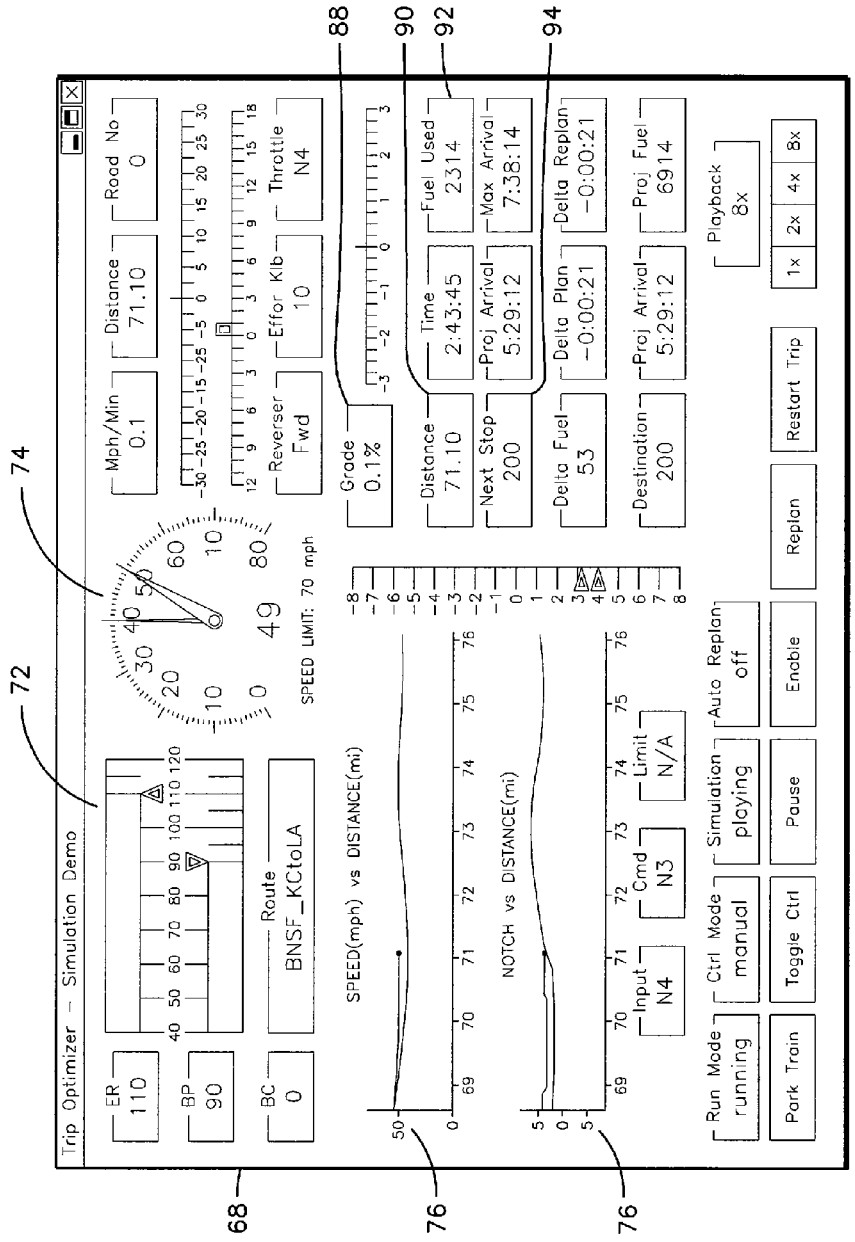
FIG. 10 depicts another exemplary illustration of a dynamic display for use by the operator.

FIGS. 8, 9 and 10 depict exemplary illustrations of dynamic displays for use by the operator. As provided, FIG. 8, a trip profile is provided 72. Within the profile a location 73 of the vehicle is provided. Such information as vehicle length 105 and the number of cars 106 in the vehicle is provided. Elements are also provided regarding track grade 107, curve and wayside elements 108, including bridge location 109, and vehicle speed 110. The display 68 allows the operator to view such information and also see where the vehicle is along the route. Information pertaining to distance and/or estimate time of arrival to such locations as crossings 112, signals 114, speed changes 116, landmarks 118, and destinations 120 is provided. A functional parameter management tool 125 allows a user to determine the fuel savings for one or more types of fuel relative to a determined baseline. The operator has the ability to alter operational parameters, such as arrival times 127, and/or can select and affect the fuel ratio. The system responds to the inputs by indicating how the manipulation affects the total fuel consumption and the individual fuel usage rates.

As illustrated in FIG. 9 an exemplary display provides information about consist data 130, an events and situation graphic 132, an arrival time management tool 134, and action keys 136. The project fuel savings and the actual amount of fuel saved are displayed. These may be the same fuel (e.g., diesel or natural gas), different fuels (e.g., diesel or natural gas), or may be a combination of both fuels in units of pounds, gallons, or in another unit. The display 68 provides touch screen keys 138 to allow the operator to re-plan as well as to disengage 140 the controller.

FIG. 10 depicts a display according to an embodiment of the invention. Data from a vehicle may include air-brake status 72, analog speedometer with digital inset 74, and information about tractive effort in pounds force (or traction amps for DC vehicles) may be displayed. An indicator 74 shows the current optimal speed in the trip plan being executed as well as an accelerometer graphic to supplement the readout in mph/minute. New data for optimal trip plan execution is displayed in the screen center. A rolling strip graphic 76 is shown with optimal speed and notch setting versus distance compared to the current history of these variables.

The location of the vehicle may be derived using the locator device. As illustrated, the location may be determined by identifying how far (time and rate of travel) the vehicle is away from its final destination along a known route, through operator input, or as an absolute position, an initial destination, and/or an intermediate point. The strip chart estimates a look-ahead to the controller to predict changes in engine operation required to follow the optimal plan. Such look-ahead functionality may be useful in determining commit change values for the conversion of liquid fuel to gaseous fuel. The vertical bar gives a graphic of desired and actual engine operation levels. When continuous notch power is utilized, the display will simply round to closest discrete equivalent, the display may be an analog display so that an analog equivalent or a percentage or actual horse power/tractive effort is displayed.

Trip status information is displayed on the screen and includes such information as: grade, distance, fuel used or remaining by fuel type, and time. The grade value may indicate the current grade the vehicle is encountering 88 or may be about to encounter. The grade may be indicative of either the lead vehicle or by a distant portion of the train. The distance may be the distance yet to go on the trip, the distance to the next refueling station, the distance to the next event of interest, or to some other area or region (e.g., a boundary line). Shown in the illustration is the distance traveled so far in the plan 90. Distance can be the distance away from the next stop planned 94. Fuel can indicate fuel used, fuel remaining, relative types of fuel and their amounts, and other fuel related information. In the illustration, the cumulative fuel used 92 is shown. Time can indicate current and projected arrival time 96 expected time to be at next stop, or alternatively can be the amount of time left for power under a particular fuel type or using a determined fuel tank. The display 68 also shows the maximum possible time to destination possible under the current fuel load. Delta plan data shows status for fuel and schedule ahead or behind the current optimal plan. Negative numbers mean less fuel or early compared to plan, positive numbers mean more fuel or late compared to plan, and a trade-off may be had in opposite directions (changing the fuel ratio to save fuel or money could make the vehicle relatively late). These displays give a viewer an operational snapshot of the vehicle.

Other features include generating information in the form of data logs and reports. This information may be stored on the vehicle and downloaded to an off-board system at some point in time, or the download may occur via manual and/or wireless transmission. This information may also be viewable by the operator via the vehicle display. The data may include such information as operator inputs, time that the system is operational, amounts and types of fuel saved, fuel imbalance by type across vehicles in the train, vehicle journey off course, system diagnostic issues and the like. This information can be compiled and used for troubleshooting and/or prognostic evaluations. Further, individual and collective (fleet) level mapping can be presented electronically (e.g., web-based) for asset management and fleet operations optimization.

Although some embodiments of the invention are described with respect to rail vehicles, specifically trains and locomotives having diesel engines, other industrial application may be found in mining and industrial equipment, marine vessels, and stationary units, each which may use a plurality of fuel types.

In the case of a stationary power generating station or network of power generating stations, a specified mission may refer to an amount of wattage (e.g., MW/hr) to be satisfied by a diesel and natural gas powered system. Relevant operating conditions for the natural gas and diesel-fueled power generating unit may include one or more of engine speed, torque load, fueling value, availability of fuel by fuel type, relative cost of each fuel type, spin up time, engine wear, emissions (particular with regard to environmental conditions, time of day, time of year), and the like.

In one exemplary example involving marine vessels, a plurality of tugs may be operating together where all are moving the same larger vessel, where each tug is communicatively linked to accomplish the mission of moving the larger vessel. Also, a single marine vessel may have a plurality of engines. Mining and industrial equipment may include a fleet of vehicles that have a mission to move earth or ore from location A to location B. Suitable mining and industrial equipment includes dump trucks, shovels, forklifts, and other off-highway vehicles. The vehicles or engines may be linked in time to accomplish a mission.

Figure 11:
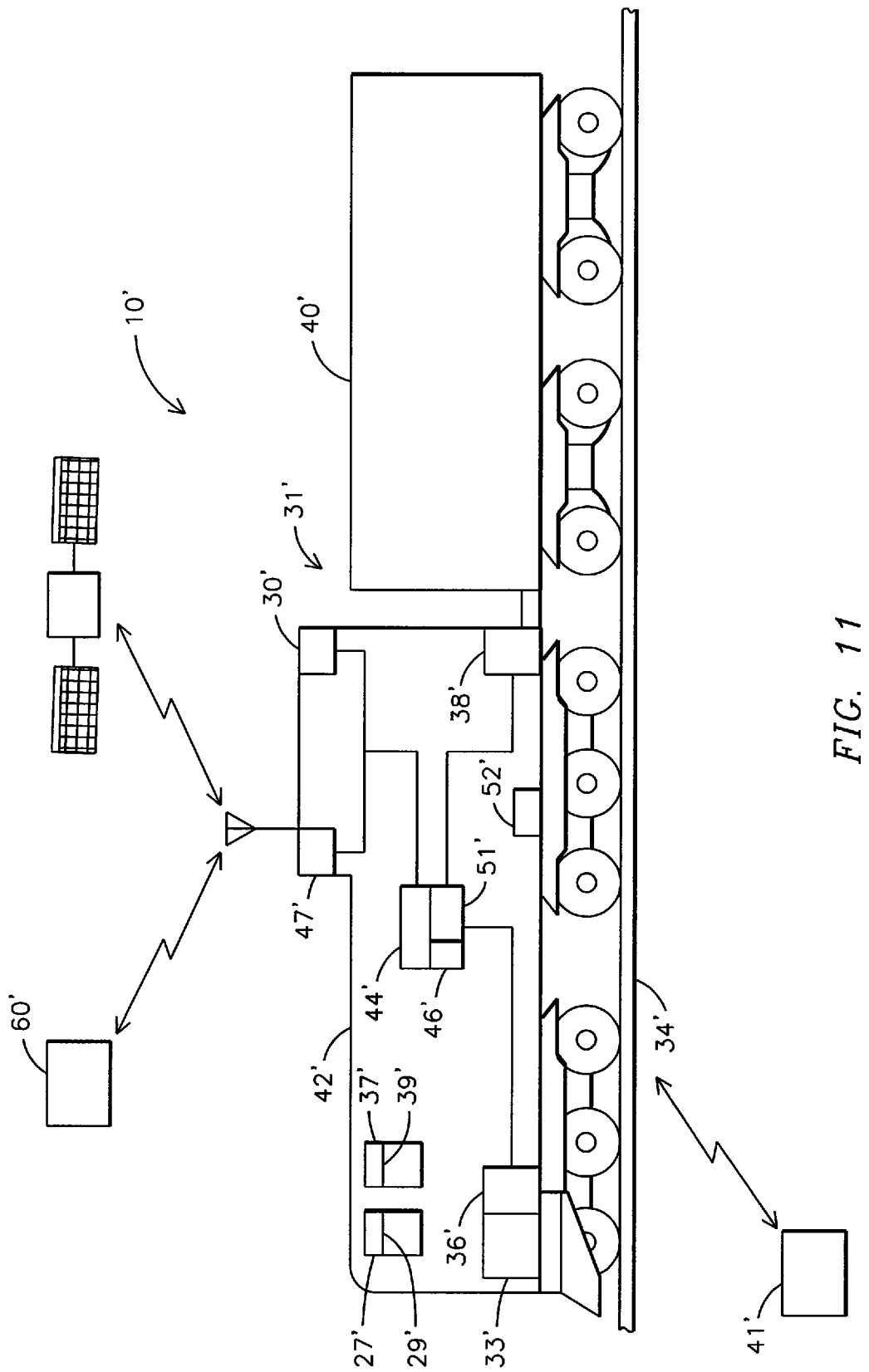
FIG. 11 depicts an exemplary embodiment of elements of the invention.

FIG. 11 illustrates a system 10' for operating a vehicle 31' in accordance with another embodiment of the invention. The vehicle may be one or of a plurality of vehicles 42'. As illustrated in FIG. 11, mining or industrial equipment, a marine vessel, or any vehicle may include an engine capable of operating on a plurality of fuel types. The plurality of fuel types may include one or more diesel based fuels and one or more alternate fuels. More particularly, each alternate fuel may include one or more of alcohol, gasoline, kerosene, natural gas, biodiesel, palm oil, and rapeseed oil. Suitable alcohols include short chain alcohols, such as methanol, ethanol, propanol, and butanol, as well as some longer and branched chain alcohols and alcohol blends.

Although some embodiments of the invention are described with respect to rail vehicles, specifically trains and vehicles having diesel engines, exemplary embodiments of the invention are also applicable for other uses, such as but not limited to off-highway vehicles, marine vessels, and stationary units, each which may use a dual fuel capable diesel engine. Towards this end, when discussing a specified mission, this includes a task or requirement to be performed by the diesel powered system. Therefore, with respect to railway, marine or off-highway vehicle applications this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating condition of the diesel-fueled power generating unit may include one or more of speed, load, fueling value, fuel ratio, timing, etc.

With regard to the fuel ratio, as used herein the term "fuel ratio" refers to the respective amounts of fuel that are consumed during a single cycle of a cylinder (all four portions of a four stroke, and both portions of a two stroke). For example, in an application where natural gas and diesel are both introduced into a cylinder for combustion, the fuel ratio is the amount of natural gas relative to the amount of diesel being consumed. While there are various ways to compare the two fuels, several of which will be disclosed, the comparison based on weight or mass is what is referred to unless context or explicit language suggests otherwise. Other methods of comparison include the thermal/chemical equivalents and the volume (in gaseous or vapor form at constant temperature/pressure). For weight based comparisons, suitable ratios may be selected based on factors disclosed in detail herein. But, the suitable ratios may be in a range of all diesel to 99.9 percent compressed natural gas (continuing with the diesel/CNG example). Operating ratios may not be so extreme, and may run from about 10 percent CNG to about 90 percent CNG. However, should the CNG source be unavailable, the diesel engine can revert to a standard all-diesel operation.

The system may include a locator device 30' to determine a location of the vehicle consist 42'. The locator device 30' can be a GPS sensor, or a system of sensors, that determine a location of the vehicle 31'. Examples of such other systems may include, but are not limited to, wayside devices, such as radio frequency automatic equipment identification (RF AEI) tags, dispatch, and/or video determination. Another system may include the tachometer(s) aboard a vehicle and distance calculations from a reference point. A wireless communication system 47' may also be provided to allow for communications between trains and/or with a remote location, such as dispatch. Information about travel locations may also be transferred from other trains.

The system 10' further includes a characterization element 33' to provide information about a terrain 34' over which the vehicle consist 42' may travel. While the terrain for a locomotive may be determined by the path of a track, mining equipment may have more degrees of freedom. The track characterization element 33' may include an on-board track integrity database 36'. Sensors 38' are used to measure a tractive effort 40' being hauled by the vehicle consist 42', throttle setting of the vehicle consist 42', vehicle consist 42' configuration information, speed of the vehicle consist 42', individual vehicle configuration, individual vehicle capability, etc. In one embodiment the vehicle consist 42' configuration information may be loaded without the use of a sensor 38', in which case the configuration information may be loaded by an input device. The input device may be coupled with the processor 44' to transfer the characteristic information of each fuel type among the plurality of fuel types to the processor, including at least one of fuel efficiency, emission characteristics, respective tank volume, cost availability, and location availability. The input device may provide the characteristic information of each of the plurality of fuel types by one of a remote location, a roadside device, and a user through manual input. In addition to the characteristic information of each of the plurality of fuel types, the health of the vehicles may also be considered. For example, if one vehicle is unable to operate above a desired power level when using a particular type of fuel this information is used when optimizing the trip plan. Thus, the fuel ratio may be adjusted to reduce the use of the particular lower power fuel type when higher power is required, and the ratio may be adjusted back to increase fuel usage of the particular fuel type as the power demand lowers. The same process may be used for emission requirements, environmental factors, and the like.

Information from the locator device 30' may also be used to determine an appropriate arrival time of the vehicle 31'. For example, if there is a vehicle 31' moving along a track 34' towards a destination and no vehicle is following behind it, and the vehicle has no fixed arrival deadline to adhere to, the locator device 30', including but not limited to radio frequency automatic equipment identification (RF AEI) tags, dispatch, and/or video determination, may be used to gage the exact location of the vehicle 31'. Furthermore, inputs from these signaling systems may be used to adjust the vehicle speed. Using the on-board track database, discussed below, and the locator device, such as GPS, the controller can adjust the operator interface to reflect the signaling system state at the given vehicle location. In a situation where signal states would indicate restrictive speeds ahead, the controller may select a fuel ratio for the vehicle to match the operating conditions with the associated optimized fuel consumption levels. The optimization, as noted elsewhere herein, may be for total use, cost, availability, emissions, and the like.

Information from the locator device 30' may also be used to change planning objectives as a function of distance to destination. For example, owing to inevitable uncertainties about congestion along the route, fuel type selections on the early part of a route may be employed as hedge against delays that statistically occur later. If it happens on a particular trip that delays do not occur, the fuel type selections on a latter part of the journey can be modified to exploit the built-in amount fuel of a particular type that was banked earlier.

The database 36' illustrated in FIG. 11 may further be used to store characteristic information for each of the plurality of fuel types. Such characteristic information for each type of fuel for each vehicle consist includes one or more of fuel efficiency, emission rate, respective tank volume, cost availability, location availability, and any other characteristic of each type of fuel relevant in optimizing the performance of the vehicle consist.

FIG. 11 further illustrates a processor 44' operable to receive information from the locator device 30', the track characterization element 33', and the database 36'. Upon the processor 44' receiving the information, a controller housing the processor with access to the information creates a trip plan that optimizes the performance of the vehicle consist 42' in accordance with one or more operational criteria for the vehicle consist. Such operational criteria may include the departure time, arrival time, speed limit restrictions along the path of travel, emission rate and mileage rate restrictions along the vehicle path, and any other criteria pertinent to the trip. The controller is used to compute an optimized trip plan based on parameters involving the vehicle 42', vehicle 31', a path of travel or track 34', and mission objectives. The controller may create a trip plan based on models for vehicle behavior as the vehicle 31' moves along the path as a solution of non-linear differential equations derived from physics with simplifying assumptions that are provided in the algorithm. The controller has access to the information from the locator device 30', track characterizing element 33', database 36', and/or sensors 38'.

For marine vessels, the processor 44' may not consider information from a track characterization element 33', as track topography is not applicable to the path of the marine vessel. However, the database 36' may include fuel type availability based upon location information from the locator device 30'. The controller for marine vessels may create a trip plan for minimizing the total fuel consumed for all fuel types subject to the availability of any particular fuel type in each region. For off-highway vehicles, the characterization element 33' may provide information for the topography of the predetermined course of the off-highway vehicle and the database 36' may include emission and mileage restrictions at each location, as with vehicles discussed above. Because the different fuel types have correspondingly different emissions profiles, the emission restrictions may be met by changing the fuel ratio of the fuel types. In one instance, a relatively higher CNG to diesel ratio may be used to reduce NOx emissions in a defined low-emissions zone.

In one embodiment, the controller creates a trip plan minimizing the total fuel consumed of all fuel types of the vehicle consist 42', subject to operational criteria for the vehicle consist, including emission rate limits over the trip, for example. For example, the controller may create trip plan to minimize the total fuel consumed for each fuel type of the plurality of fuel types of the vehicle consist 42', subject to a maximum emission rate of 5.5 g/HP-hr, in addition to other operational criteria selected based on operation specific parameters. Particularly, the controller creates a trip plan minimizing the total fuel consumed of each fuel type of the plurality of fuel types, where the total fuel consumed includes a weighted sum with weighted coefficients of each respective fuel consumed of each respective type of fuel. In accordance with the equations disclosed in previous embodiments, the total fuel consumed may be calculated using an equation for the total fuel mileage rate, expressed as:

$$F = k1*F1 + k2*F2 + \ldots$$

where F is the total fuel efficiency (time rate) for all of the plurality of fuel types, F1 and F2 are the respective fuel efficiencies for fuels #1 and #2, and k1 and k2 are the respective weighted coefficients for fuels #1 and #2. Although the fuel efficiency time rate is given above, it may be converted to a fuel efficiency distance rate and the total fuel consumed may accordingly be computed by integrating F over the distance constituting the overall trip.

In minimizing the total fuel cost by fuel type, the controller determines each respective weighted coefficient for each respective type of fuel for the trip plan that minimizes the total fuel cost of the plurality of types of fuel of the vehicle consist 42'. For example, where the vehicle consist 42' operates on fuels #1 and #2, the controller may create a trip plan minimizing the total fuel consumed for the vehicle consist 42' by determining a weighted coefficient for fuel #1 to be 0.3 and a weighted coefficient for fuel #2 to be 0.7. If fuel #1 were diesel, and fuel #2 were CNG, then a 30 percent diesel and 70 percent CNG ratio could be obtained by weighting.

Each weighted coefficient for each type of fuel depends on various factors, including the respective fuel emission rate, time of the year, cost availability, reliability of the system when operating on each type of fuel, respective fuel tank volume, and location availability. The weighted coefficient varies with fuel emission rate since the particular trip and operational criteria may involve a particular low or high emission rate limit based on location, and consequently the respective fuel emission rate is considered when evaluating the weighted coefficient. The location availability and time of the year are considered, as one particular fuel may be plentiful during one particular season or a particular region, but rare in another season or region.

As illustrated in FIG. 3, the respective tank volume is considered, as each respective fuel is held in respective fuel tanks 27,37 and their respective volume levels 29,39 in those tanks, coupled with the mileage rates, indicates the remaining fuel range for a respective fuel. The controller compares whether the remaining range of a particular fuel with the distance to a future stop of the vehicle consist when computing each weighted coefficient, and whether that fuel is available to be re-filled at each particular stop.

In the absence of a trip plan, or if there is incomplete information to generate a full trip plan, optimization may be based on a power demand or a fuel demand as it is called for at a particular time. Alternatively, the trip plan may be generated based on stored information regarding a prior history of power/fuel demand. In various examples, the controller can access stored information to know that i) the average power demand in a period over the last hour was 2200 HP, ii) the average power demand in a period over the last day was 1800 HP, iii) the last instance where a vehicle was at this location the power demand was 2100 HP, or iv) the average power demand for the vehicle as it has passed a particular location over a defined number of instances was 1900 HP. Alternatively, the controller may communicate with stored information that includes information about other vehicles power demand (or fuel demand) instead of, or in combination with, the values for the instant vehicle. Thus, the first time a particular vehicle moves through a location (and correspondingly has no historical information about that vehicle's power demand at the location) the vehicle may still be able to calculate the trip plan based on stored information about the power or fuel demand by other vehicles similarly situated.

Further, the power demand information could be weighted or adjusted to HP/ton to account for the change in power consumption due to load. Similarly, in the absence of information, or if the information is incomplete, to generate the trip plan and as regarding fuel availability, the optimization plan can be achieved based on one or more of i) the current fuel level in the tank, ii) fuel tank storage capacity, or iii) the history of fuel addition to the vehicle as retrieved from stored information. In various examples, the stored information may include the fact that in the last 24 hour period 10,000 lbs of fuel Type A and 18,000 lbs of fuel Type B were added and made available to the vehicle; or, that the last time this path was traversed 12,000 lbs of fuel Type A and 13,500 lbs of fuel Type B were added and made available to the vehicle.

In one embodiment, the controller 51' creates a trip plan minimizing the total emission output of each fuel type of the plurality of fuel types of the vehicle consist 42', subject to operational criteria for the vehicle consist, including mileage rate limits over the trip, for example. For example, the controller may create trip plan to minimize the emission output for each fuel type of the plurality of fuel types of the vehicle consist 42' subject to a maximum mileage rate of 10 mpg, in addition to those other operational criteria discussed above. More particularly, the controller creates a trip plan minimizing the total emission output of each fuel type of the plurality of fuel types, where the total emission output includes a weighted sum with weighted coefficients of each respective emission output of each respective type of fuel. In accordance with the equations disclosed in previous embodiments, the total emission output may be calculated using an equation for the total emission rate, expressed as:

$$E = l1*E1 + l2*E2 + \ldots$$

where E is the total emission rate (time rate or distance rate) for all of the plurality of fuel types, E1 and E2 are the respective emission rates for fuels #1 and #2, and l1 and l2 are the respective weighted coefficients for fuels #1 and #2.

In minimizing the total emission output for each fuel type, the controller determines each respective weighted coefficient for each respective type of fuel for the trip plan that minimizes the total emission output for the plurality of types of fuel of the vehicle consist 42'. For example, where the vehicle consist 42' operates on fuels #1 and #2, the controller may create a trip plan minimizing the total emission output for the vehicle consist 42' by determining a weighted coefficient for fuel #1 to be 0.8 and a weighted coefficient for fuel #2 to be 0.2. Each weighted coefficient for each type of fuel depends on various factors, including the respective fuel mileage rate, time of the year, cost, availability, fuel reliability, respective fuel tank volume, and location availability, in terms of its raw availability in each location and regional restrictions, including emission restrictions in each location. The weighted coefficient varies with fuel mileage rate since the particular trip and operational criteria may involve a particular low or high fuel mileage limit, and consequently the respective fuel mileage rate is considered when evaluating the weighted coefficient. The location availability and time of the year are considered, as one particular fuel may be plentiful during one particular season or a particular region, but rare in another season or region.

As illustrated in FIG. 11, the respective tank volume is considered as each respective fuel is held in respective fuel tanks 27',37' and their respective volume levels 29',39' in those tanks, coupled with the mileage rates, indicates the remaining range of a respective fuel. The controller compares the remaining range of a particular fuel with the distance to a future stop of the vehicle consist when computing each weighted coefficient, and whether that fuel is available to be re-filled at each particular stop.

Although FIG. 11 illustrates respective fuel tanks 27', 37' for respective fuel types, each fuel tank 27', 37' may be used to hold different fuel types at different times during a vehicle trip. Each fuel tank 27', 37' may include sensors for each fuel type. In one embodiment, each sensor may be used to identify which fuel type is within each fuel tank 27', 37' at different times. The sensors may include sensors which identify a fuel type within each fuel tank 27', 37' based upon information provided to the vehicle 10', including manual sensors, electronically transmitted fuel type information from a fuel source such as a railroad or adjacent vehicle, and location information where the fuel tank 27', 37' is filled. The processor 44' may include fuel type information for each location where filling takes place. The sensors may further identify a fuel type within each fuel tank 27', 37' based upon properties of the fuel type within each tank 27', 37' detected by the vehicle. Such properties may include physical properties of each fuel type, including viscosity and density, for example, or chemical properties of each fuel type, including fuel or thermal value, for example. These properties of each fuel type may be detected by sensors or devices within the vehicle. The sensors may further identify a fuel type within each fuel tank 27', 37' based upon vehicle performance characteristics, such as the vehicle engine performance, while assessing the input and output properties of each fuel type to the engine. For example, for the vehicle engine to produce 1000 HP, the fuel regulator may include a stored fuel A input requirement of 200 gallons, but a fuel B requirement of 250 gallons. Accordingly, the fuel type within each tank 27', 37' may be identified by assessing the stored fuel input and output characteristics with the vehicle engine characteristics.

After creating a trip plan and determining each weighted coefficient for each particular fuel for the plurality of fuel types, each weighted coefficient may be stored in the database 36' for subsequent retrieval when the trip re-commences. Additionally, the weighted coefficients may be shared with other vehicles partaking in similar trips.

In addition, the controller may create a trip plan establishing a desired trip time, and/or ensuring proper crew operating time aboard the vehicle consist 42'. In one embodiment, a driver, operator or controller 51' is also provided. As discussed herein the controller 51' is used for controlling the vehicle as it follows the trip plan. In one embodiment, the controller 51' makes vehicle operating decisions autonomously.

A feature of the controller is the ability to initially create and modify on the fly any plan that is being executed. This includes creating the initial plan when a long distance is involved, owing to the complexity of the plan optimization algorithm. Although only a single controller is discussed in detail, the calculations may be done in a distributed manner. When a total length of a trip profile exceeds a given distance, the controller may segment the mission by waypoints. The waypoint may include natural locations where the vehicle 31' stops, such as sidings where a meet with opposing traffic, or pass with a vehicle behind the current vehicle is scheduled to occur on single-track rail, or at yard sidings or industry where cars are to be picked up and set out, and locations of planned work. At such waypoints, the vehicle 31' may be required to be at the location at a scheduled time and be stopped or moving with speed in a specified range. Dwell time is the time duration from arrival to departure at a waypoint.

Upon the controller creating a trip profile within each segment, the weight coefficients for each fuel among the plurality of fuels in each respective segment may be selected based on pre-determined factors (such as cost, availability, desired emissions levels, required power levels, and the like). With regard to the emissions requirements, differing requirements may be considered. For example, there may be differing requirements between geographically agnostic emissions requirements and local emissions requirements. Suitable geographically agnostic emissions requirements include those covered by federal or country level regulations, and may be absolute caps on the amount of any particular controlled substance emission. By way of contrast, a local emission requirement may be to a different controlled substance or may have a different threshold level associated therewith. A vehicle moving along a route that passes through a heavily populated area may be operating under a first emissions requirement throughout the trip, but while in the heavily populated area may have more types of emissions controls or controls on the same substances but at different (likely lower) threshold limits.

Figure 12:
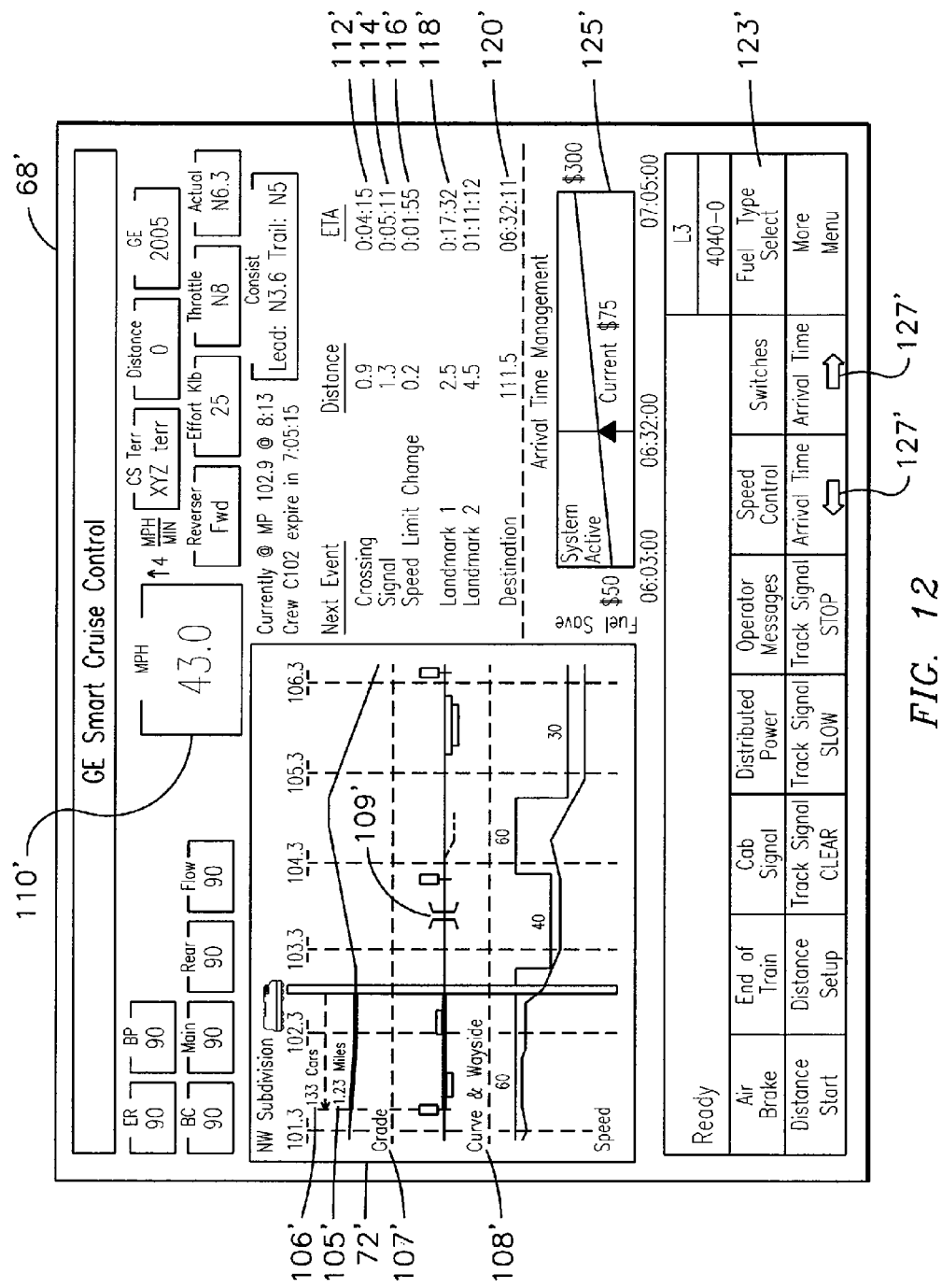
FIG. 12 depicts an exemplary illustration of a dynamic display for use by the operator.
Figure 13:
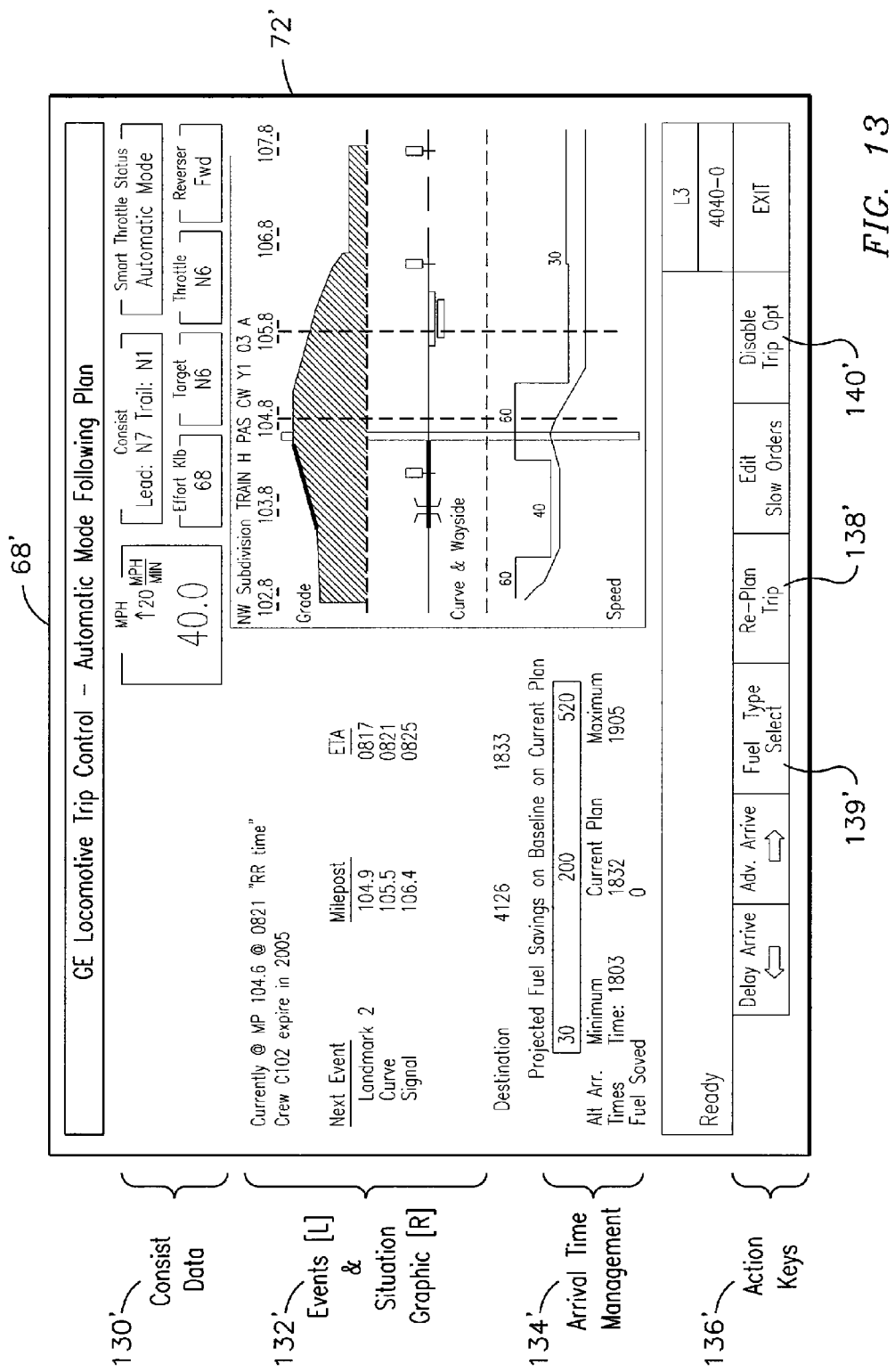
FIG. 13 depicts another exemplary illustration of a dynamic display for use by the operator.
Figure 14:
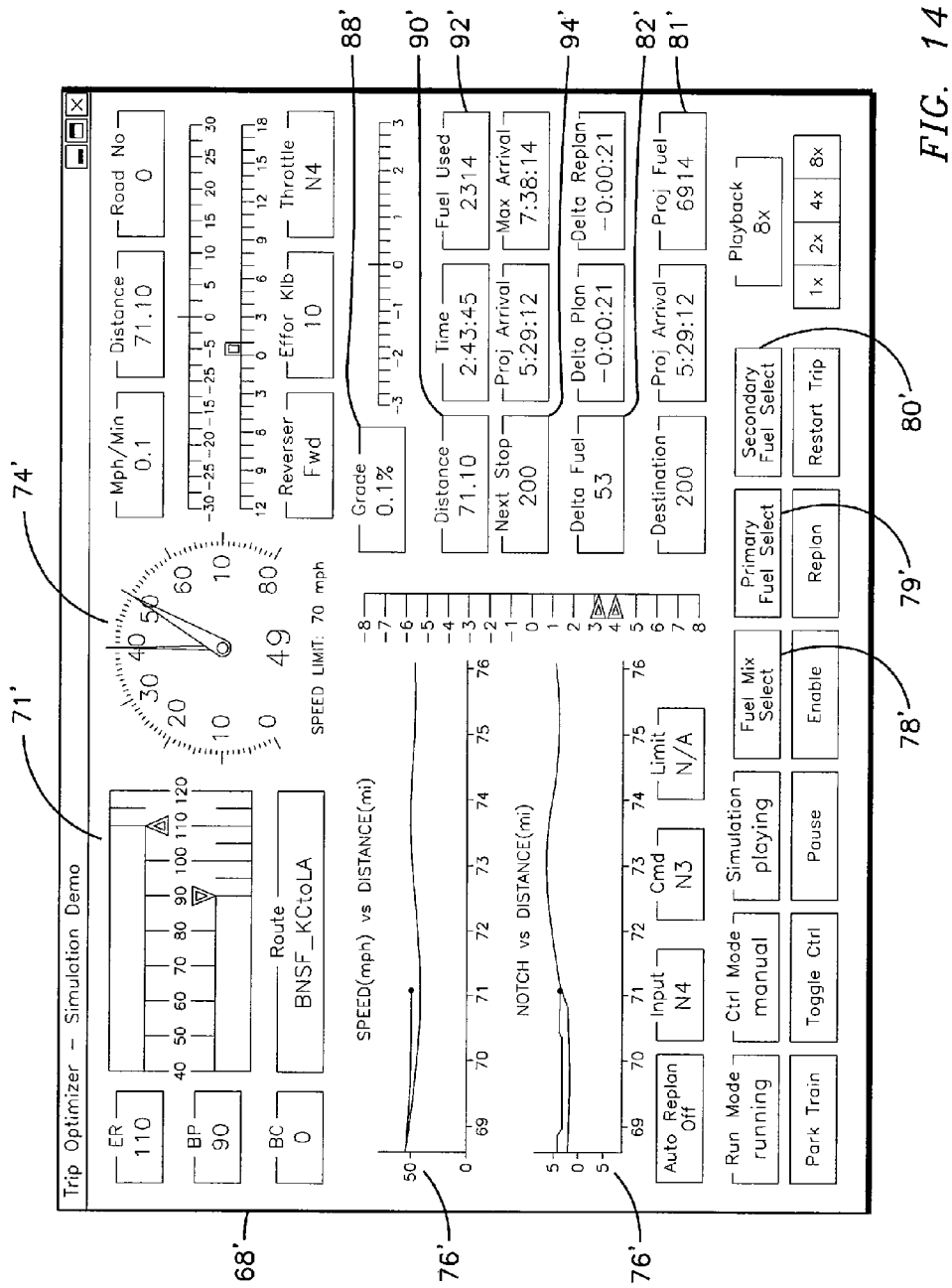
FIG. 14 depicts another exemplary illustration of a dynamic display for use by the operator.

Additionally, as illustrated in FIGS. 12-14, a user interface element 68' is connected to the processor and selectively displays the volume of each respective type of fuel of the plurality of fuel types. In FIG. 12, the user interface element 68' may select among the various types of fuels using a selection button 123', and view the cost savings for each particular fuel at an arrival time management portion 125' of the display 68'. In FIG. 13, the user may select among the various types of fuels using the select button 139' and view the projected cost savings for each particular fuel at the arrival time management portion 134' of the display 68'. Additionally, in FIG. 14, the user may select which fuel among the plurality of fuel types is primary and secondary. After designating the primary and secondary fuels, the user may push the primary fuel select button 79' to view the projected remaining miles 81' of primary fuel in its respective tank, and the amount of primary fuel behind/ahead of the trip plan, at the delta fuel portion 82'.

Additionally, the user may push the secondary fuel select button 80' to view the projected remaining miles 81' of a secondary fuel as it is available in its respective tank, and similarly the amount of secondary fuel behind/ahead of the trip plan, at delta fuel portion 82'. To view the projections of the mix of primary and secondary fuels, the user may push the fuel mix select button 78'.

Suitable vehicles include mining or industrial equipment, a marine vessel, or a vehicle including an engine operating on a plurality of types of fuel. The plurality of fuel types can include diesel fuel, as well as one or more alternate fuels. Suitable alternate fuel may include one of natural gas, alcohol, biodiesel, palm oil, and rapeseed oil.

Each vehicle includes an engine operating on a plurality of fuel types. The method includes determining the location of the vehicle, providing information about a terrain over which the vehicle may travel, and storing characteristic information associated with each type of fuel. A trip plan may be created that optimizes performance of the vehicle in accordance with one or more operational criteria. The characteristic information for each type of fuel for each vehicle may include fuel efficiency, emission efficiency, respective tank volume, cost, fuel availability, or location availability.

Creating a trip plan may include minimizing the cost of fuel consumed of each type of fuel, or of the total fuel consumed. A weighted sum may be used having weighted coefficients of each respective fuel consumed of the plurality of fuel types. The trip plan may be based at least in part on the respective weighted coefficients for the trip plan that minimize the cost of the fuel consumed of each type of fuel.

Figure 15:
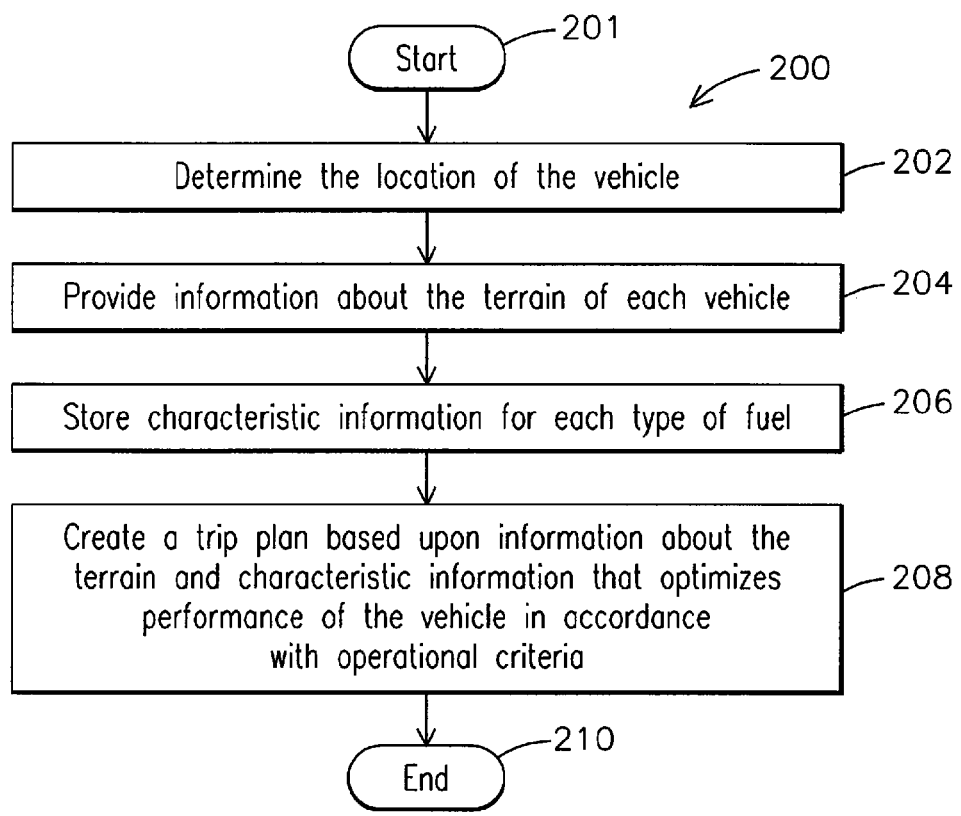
FIG. 15 is an exemplary embodiment of a method of the invention.

A method 200 for operating at least one vehicle 31' is indicated in FIG. 15, where each vehicle 31' includes an engine operating on at least one type of fuel. The method begins (block 201) by determining (block 202) the location of the vehicle, followed by providing (block 204) information about a terrain of each vehicle. Additionally, the method 200 includes storing (block 206) characteristic information for each type of fuel, and creating (block 208) a trip plan that optimizes performance in accordance with one or more operational criteria for the vehicle, before ending (block 210).

In another embodiment of a method, the method comprises receiving a control input responsive to a trip plan for a vehicle from a user interface that is configured to display aspects of the trip plan to a user. The method further comprises controlling a fuel system of the vehicle automatically based on the control input to supply a first fuel to an engine and to supply a different, second fuel to the engine; the engine is operable to propel the vehicle using the first fuel and the second fuel. The control input is generated responsive to manipulation of the user interface. The control input comprises at least one of a first signal or a second signal. In the case of the first signal, the first signal indicates a user-selected throttle setting for the vehicle; the fuel system is automatically controlled to supply the first fuel, the second fuel, or a combination of the first and second fuels to the engine based at least in part on the throttle setting. In the case of the second signal, the second signal indicates a user-selected fuel ratio of the first fuel relative to the second fuel; the fuel system is automatically controlled to supply the first fuel, the second fuel, or the combination of the first and second fuels to the engine based at least in part on the user-selected fuel ratio.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   an engine;
   a fuel system operably coupled to the engine to provide a first fuel to the engine and a second fuel to the engine; and
   at least one controller operable to control the engine and fuel system, wherein the at least one controller is configured to:
      control the fuel system to concurrently supply the first fuel at a first flow volume and the second fuel at a second flow volume to the engine to define an initial fuel ratio;
      change the first flow volume, the second flow volume, or both the first and second flow volumes to define a subsequent fuel ratio at which the first fuel and the second fuel are concurrently supplied to the engine in response to a change in a power demand on the engine or in a speed of the engine;
      control the engine according to a trip plan; and
      adjust at least one of the initial fuel ratio or the subsequent fuel ratio during movement of a vehicle that includes the engine and fuel system.

2. The system of claim 1, wherein the first fuel comprises diesel and the second fuel comprises natural gas.

3. The system of claim 1, wherein at least one of the first fuel or the second fuel comprises methane gas.

4. The system of claim 1, wherein at least one of the first fuel or the second fuel comprises biodiesel, palm oil, or rapeseed oil.

5. The system of claim 1, wherein at least one of the first fuel or the second fuel comprises ethanol.

6. The system of claim 1, wherein the at least one controller is operable to change an operating mode of the engine based at least in part on characteristic information for at least one of the first or second fuels, and the characteristic information including at least one of emissions generated by the engine, relative fuel costs, or fuel location availability.

7. The system of claim 1, wherein the engine is operable to propel the vehicle, and the at least one controller is operable to control the engine according to the trip plan that minimizes or reduces the amount consumed of each of the first fuel and the second fuel, relative to operation of the vehicle or engine without the trip plan, in accordance with an operational criterion of the vehicle or engine, the operational criteria comprising at least one emission rate limit.

8. The system of claim 1, wherein the engine is operable to propel the vehicle, and the at least one controller is operable to respond to an autonomous update to the trip plan as the vehicle progresses on a trip.

9. The system of claim 1, further comprising a locator device to determine a location of the vehicle propelled by the engine, and the locator device is configured to communicate the location of the vehicle to the at least one controller so that the at least one controller can change at least one of the initial fuel ratio or the subsequent fuel ratio based, at least in part, on the location of the vehicle.

10. The system of claim 1, wherein the at least one controller is configured to change at least one of the initial fuel ratio or the subsequent fuel ratio based, at least in part, on one or more of an ambient pressure, an ambient temperature, or a rate of change in a grade of a route being traveled by the vehicle.

11. The system of claim 1, wherein the at least one controller is operable to communicate with a user interface to selectively display one or more of:
   a respective future anticipated mileage remaining for each of the first and second fuels;
   a cost savings calculated based on predicted consumption of each of the first and second fuels available to the engine at a determined fuel ratio; or
   an emissions value based on predicted emission amounts at a determined fuel ratio for one or more of NOx, SOx, hydrocarbons, carbon dioxide, carbon monoxide, or particulate matter.

12. The system of claim 1, wherein the at least one controller is operable to adjust one or both of the initial fuel ratio or the subsequent fuel ratio based on one or more of fuel availability, time of use of one or more of the first fuel or the second fuel, date of the use of the one or more of the first fuel or the second fuel, power requirements of the vehicle, geographically agnostic emissions requirements, local emissions requirements, or relative fuel costs.

13. The system of claim 1, wherein the engine is configured to operate in multiple operating modes, wherein the engine consumes different ratios of the first and second fuels when the engine operates in different modes of the multiple operating modes such that, when the engine operates in a first operating mode, the engine is configured to consume the first fuel and the second fuel at the initial ratio and, when the engine operates in a different, second operating mode, the engine is configured to consume the first fuel and the second fuel at the subsequent ratio.

14. The system of claim 1, wherein the first fuel and the second fuel are stored in respective fuel tanks on board at least one of the vehicle or a vehicle consist of which the vehicle is a part.

15. A system comprising:

an engine;

a fuel system operably coupled to the engine to provide a first fuel to the engine and a second fuel to the engine; and at least one controller operable to control the engine and fuel system, wherein the at least one controller is configured to:

control the fuel system to concurrently supply the first fuel at a first flow volume and the second fuel at a second flow volume to the engine to define a first fuel ratio;

change the first flow volume, the second flow volume, or both the first and second flow volumes to define a second fuel ratio at which the first fuel and the second fuel are concurrently supplied to the engine in response to a change in a power demand on the engine or in a speed of the engine; and adjust at least one of the first fuel ratio or the second fuel ratio during movement of a vehicle that includes the engine and fuel system.

16. The system of claim 15, wherein the first fuel comprises diesel and the second fuel comprises natural gas.

17. The system of claim 15, wherein at least one of the first fuel or the second fuel comprises methane gas.

18. The system of claim 15, wherein at least one of the first fuel or the second fuel comprises biodiesel, palm oil, or rapeseed oil.

19. The system of claim 15, wherein at least one of the first fuel or the second fuel comprises ethanol.

20. A vehicle comprising:

an engine;

a fuel system operably coupled to the engine to provide a first fuel to the engine and a second fuel to the engine, wherein the fuel system is configured to receive the first fuel and the second fuel from respective tanks on board at least one of the vehicle or another vehicle of a vehicle consist that includes the vehicle and the another vehicle;

at least one controller operable to control the engine and fuel system, wherein the at least one controller is configured to:

control the fuel system to concurrently supply the first fuel at a first flow volume and the second fuel at a second flow volume to the engine to define a first fuel ratio;

change the first flow volume, the second flow volume, or both the first and second flow volumes to define a second fuel ratio at which the first fuel and the second fuel are concurrently supplied to the engine in response to a change in a power demand on the engine or in a speed of the engine;

control the engine according to a trip plan; and adjust at least one of the first fuel ratio or the second fuel ratio during movement of a vehicle that includes the engine and fuel system.

* * * * *